United States Patent
Benedetti

(10) Patent No.: US 10,093,490 B2
(45) Date of Patent: Oct. 9, 2018

(54) CONVEYOR APPARATUS FOR THE TRANSPORTATION AND WEIGHING OF AGRICULTURAL PRODUCTS

(71) Applicant: UNITEC S.p.A., Lugo (IT)

(72) Inventor: Luca Benedetti, Savarna (IT)

(73) Assignee: UNITEC S.P.A., Lugo (RA) (IT)

( * ) Notice: Subject to any disclaimer, the term of this patent is extended or adjusted under 35 U.S.C. 154(b) by 0 days.

(21) Appl. No.: 15/511,738

(22) PCT Filed: Sep. 10, 2015

(86) PCT No.: PCT/IB2015/056943
§ 371 (c)(1),
(2) Date: Mar. 16, 2017

(87) PCT Pub. No.: WO2016/042442
PCT Pub. Date: Mar. 24, 2016

(65) Prior Publication Data
US 2017/0247198 A1     Aug. 31, 2017

(30) Foreign Application Priority Data

Sep. 17, 2014    (IT) .............................. PN2014A0043

(51) Int. Cl.
*B65G 17/32*     (2006.01)
*B65G 47/90*     (2006.01)
(Continued)

(52) U.S. Cl.
CPC .............. *B65G 47/842* (2013.01); *B07C 5/24* (2013.01); *B65G 17/323* (2013.01);
(Continued)

(58) Field of Classification Search
None
See application file for complete search history.

(56) References Cited

U.S. PATENT DOCUMENTS 6,234,300 B1 *   5/2001   De Vos ..................... B07C 5/18
198/370.03

FOREIGN PATENT DOCUMENTS

EP     0 471 401 A2    2/1992
EP     0 687 508 A1    12/1995
(Continued)

*Primary Examiner* — Kavel Singh
(74) *Attorney, Agent, or Firm* — Birch, Stewart, Kolasch & Birch, LLP

(57) ABSTRACT

Method for the transportation and weighting of each of a continuous succession of agricultural products comprising a singling device with a plurality of pockets linearly arranged and on a rectilinear motion in translation along a parallel direction to the alignment line of the pockets, wherein the products are grasped in a drawing station by means of a first transferring means provided with gripping devices (grippers) opening downside and transferred to a release station wherein they are placed onto a second transferring means, wherein said gripping devices grasp in succession the products arranged on said singling device and wherein during the transportation onto the first transferring said products are singly weighed; said gripping means and the respective products are subjected to, in said first transferring means, a translation and to sequential and ordered distribution along two or more distinct and parallel alignment axes; said second transferring means comprises a plurality of movable conveyors parallel one to the other, aligned onto the respective vertical plane with respective alignment axes, and provided with a plurality of containers and open at the top; the motion of said grippers and of said containers is such that to a same gripping device is associated a corresponding one of said containers, so that each gripping device releases the respective product onto a respective one of said containers.

17 Claims, 19 Drawing Sheets

Figure 1:
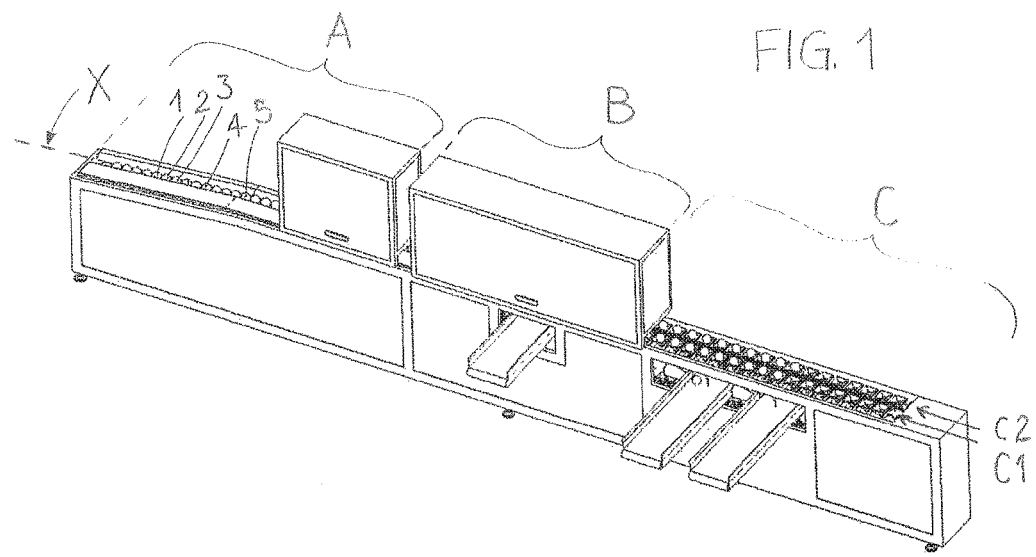

(51) Int. Cl.
- *B65G 17/00* (2006.01)
- *B65G 47/86* (2006.01)
- *B07C 5/24* (2006.01)
- *B65G 47/96* (2006.01)

(52) U.S. Cl.
CPC .... *B65G 47/967* (2013.01); *B07C 2501/0081* (2013.01); *B65G 2201/0211* (2013.01)

(56) References Cited

FOREIGN PATENT DOCUMENTS

| | | |
|---|---|---|
| EP | 1 780 151 A2 | 5/2007 |
| JP | 2-282115 A | 11/1990 |
| WO | WO 97/42112 A1 | 11/1997 |
| WO | WO 01/51390 A1 | 7/2001 |
| WO | WO 2010/083567 A1 | 7/2010 |

\* cited by examiner

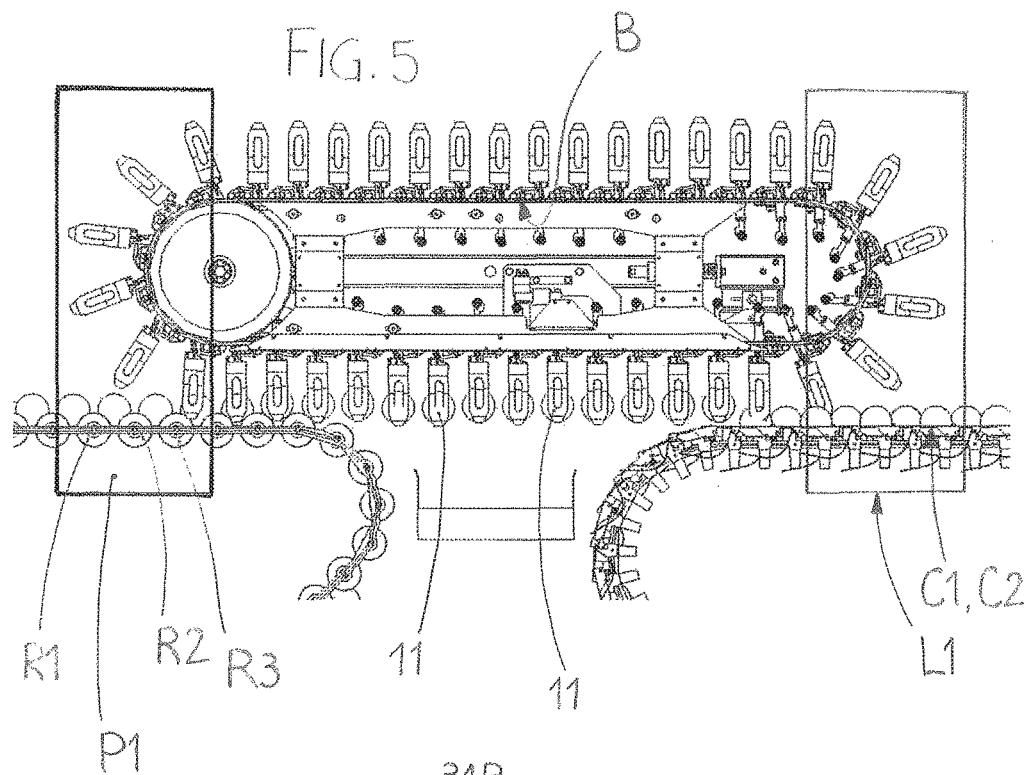
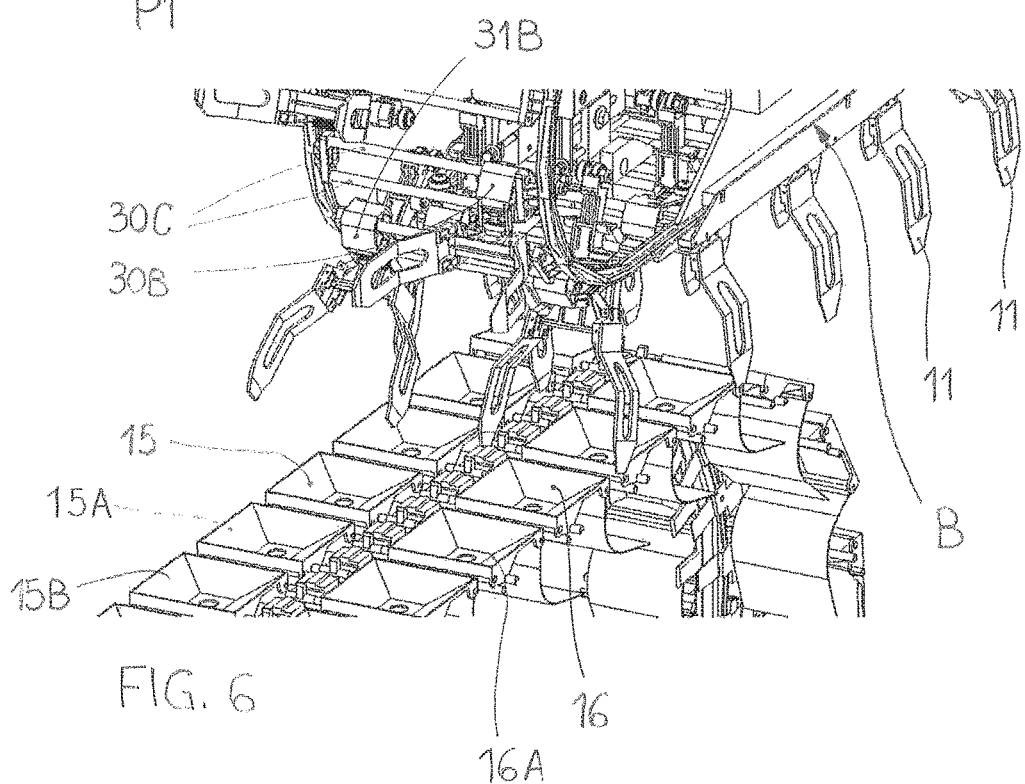

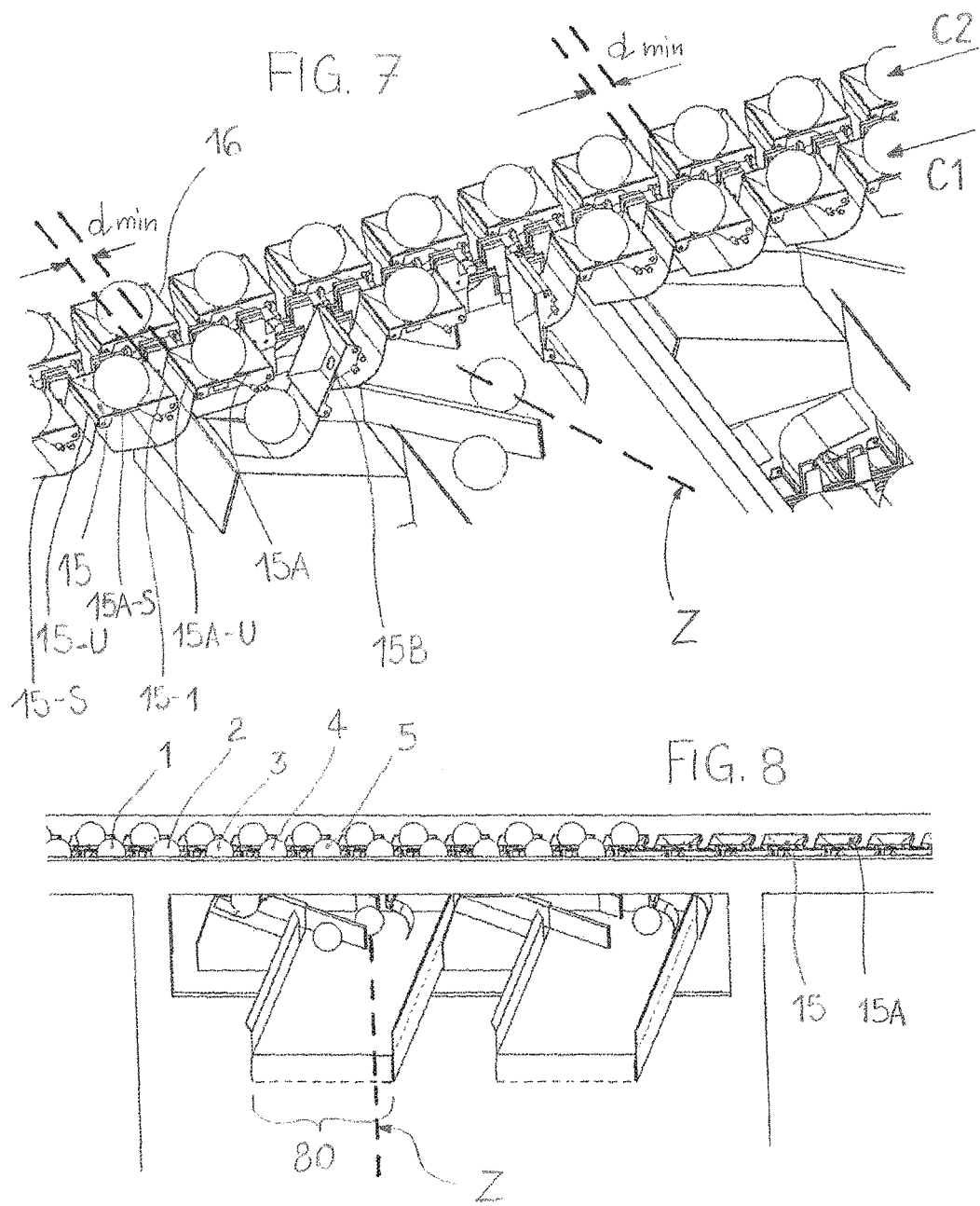

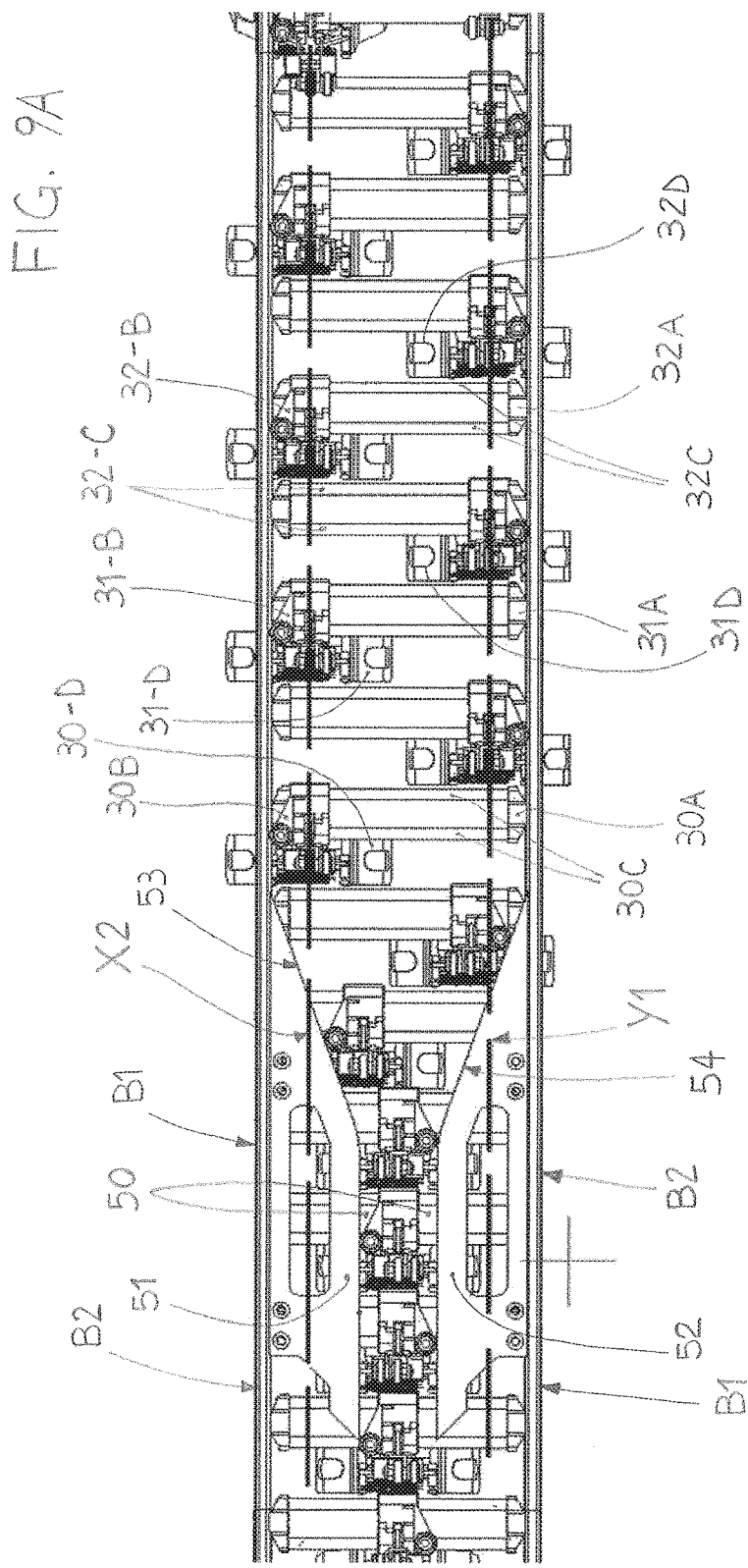

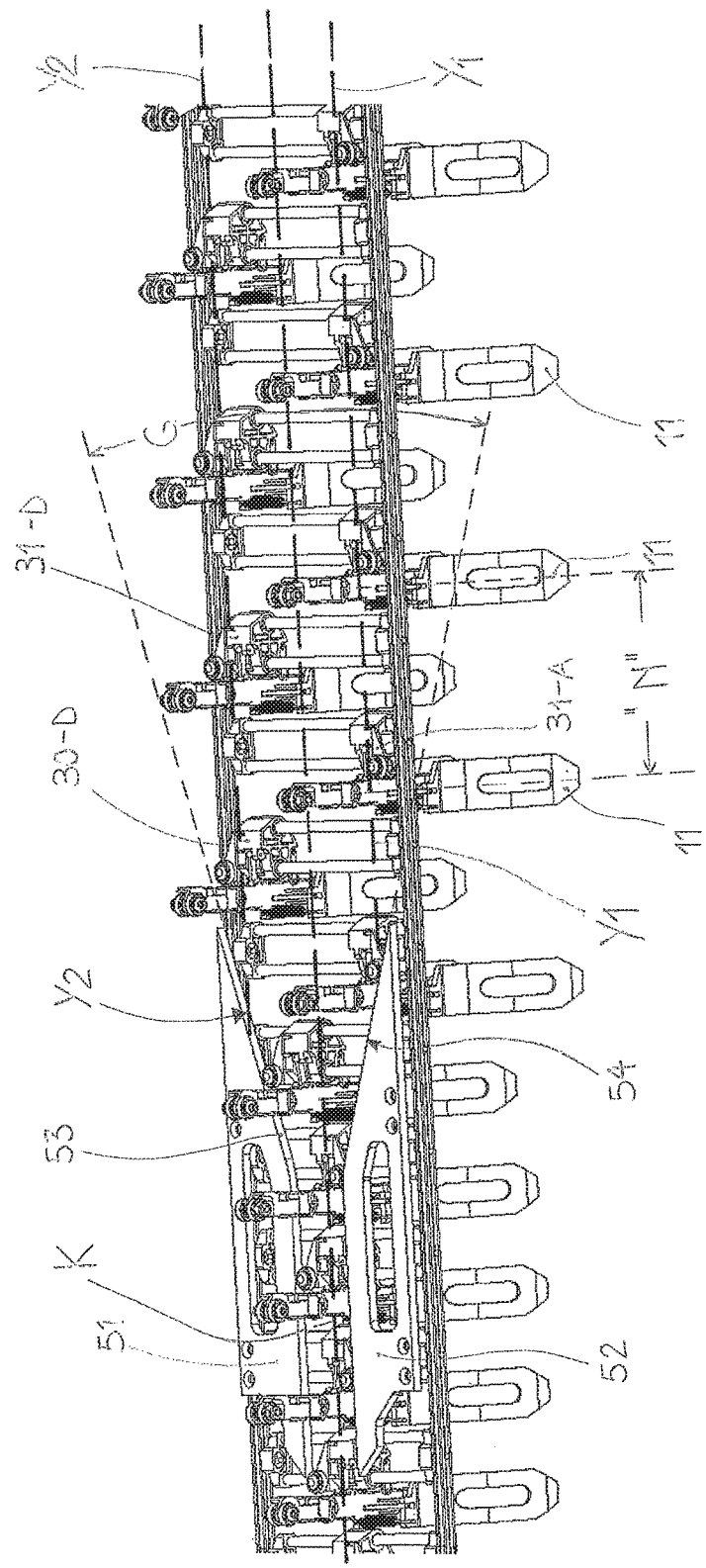

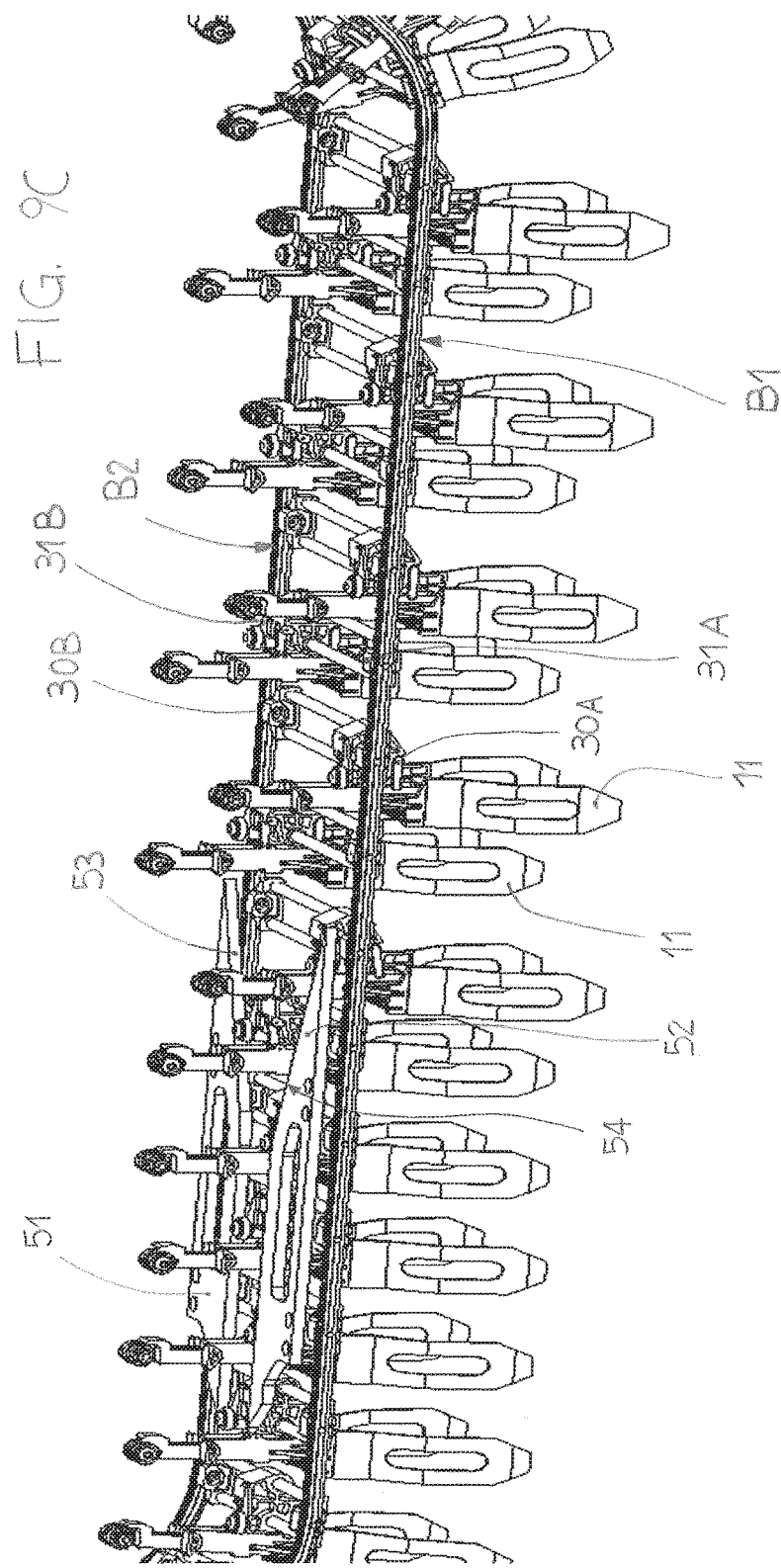

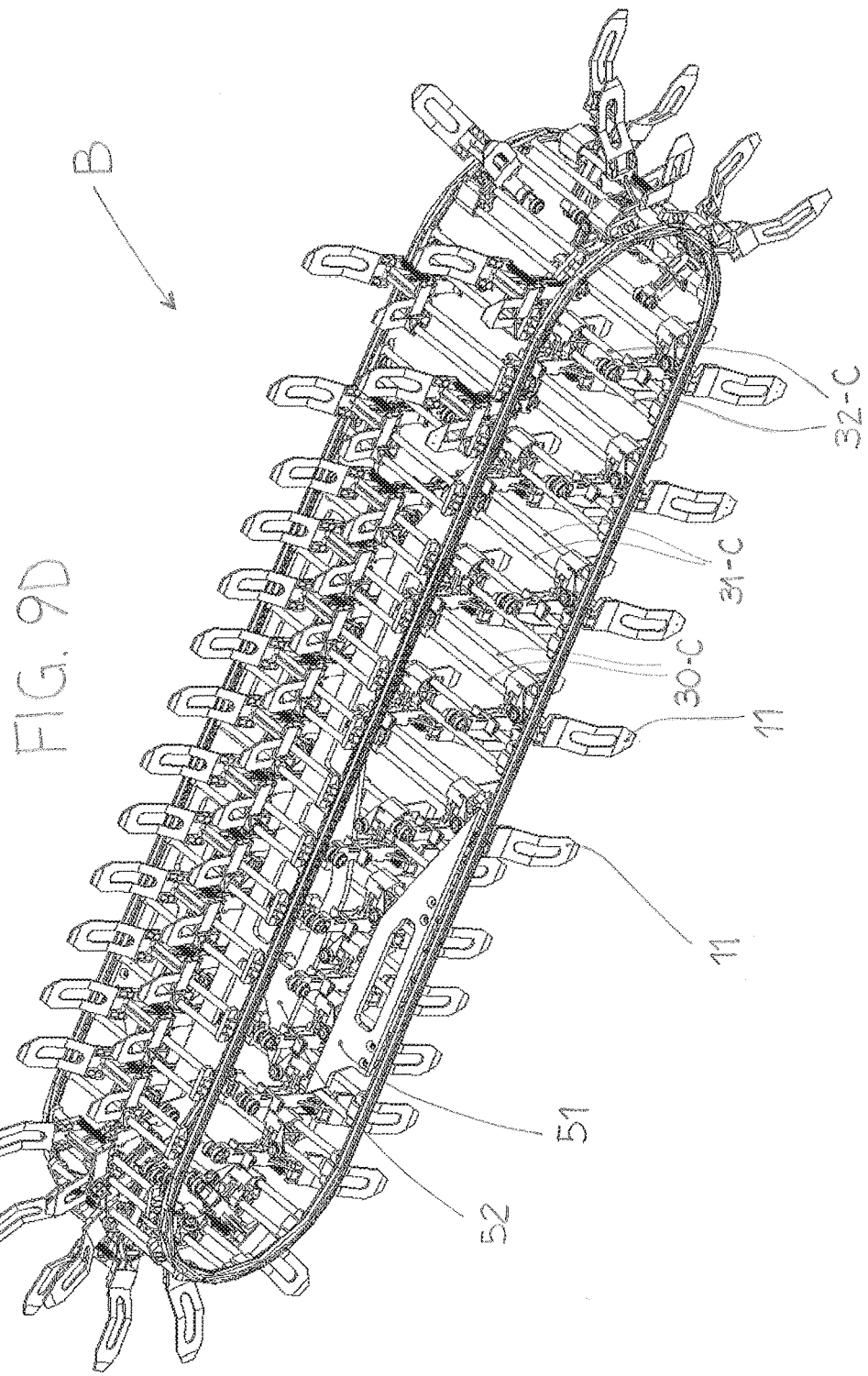

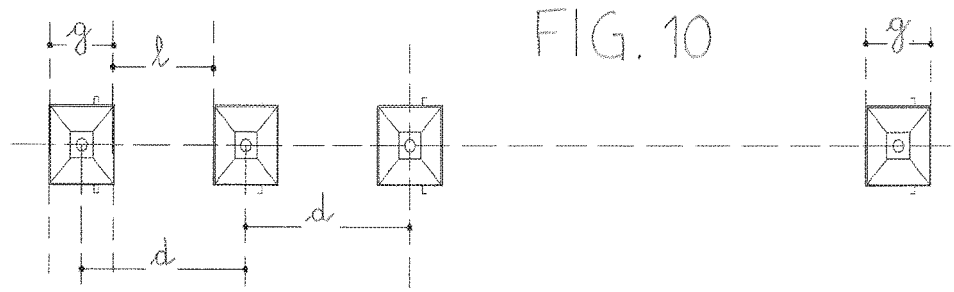
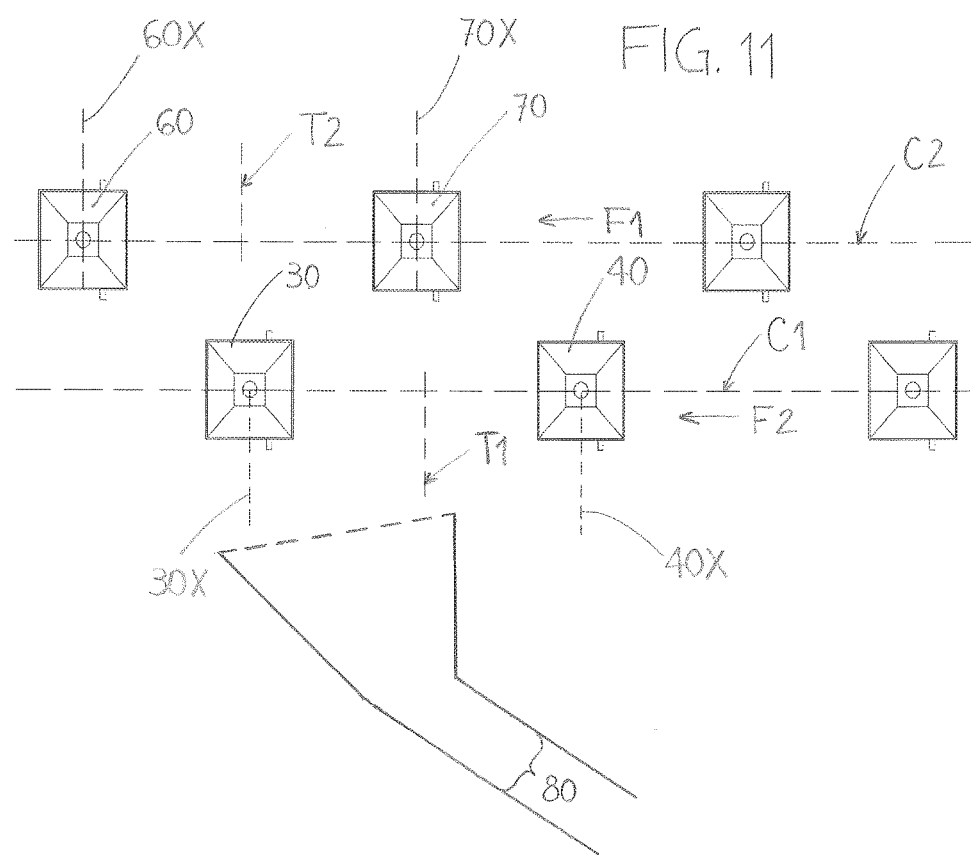

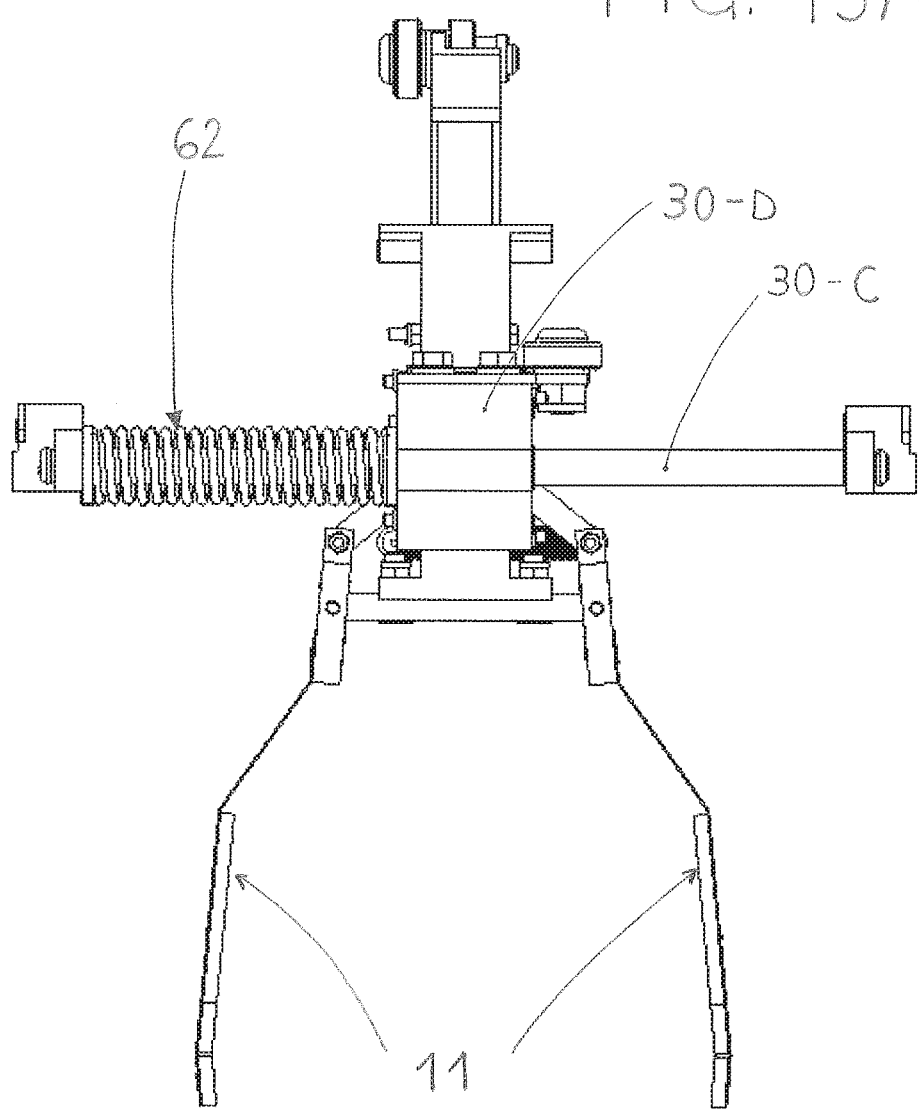

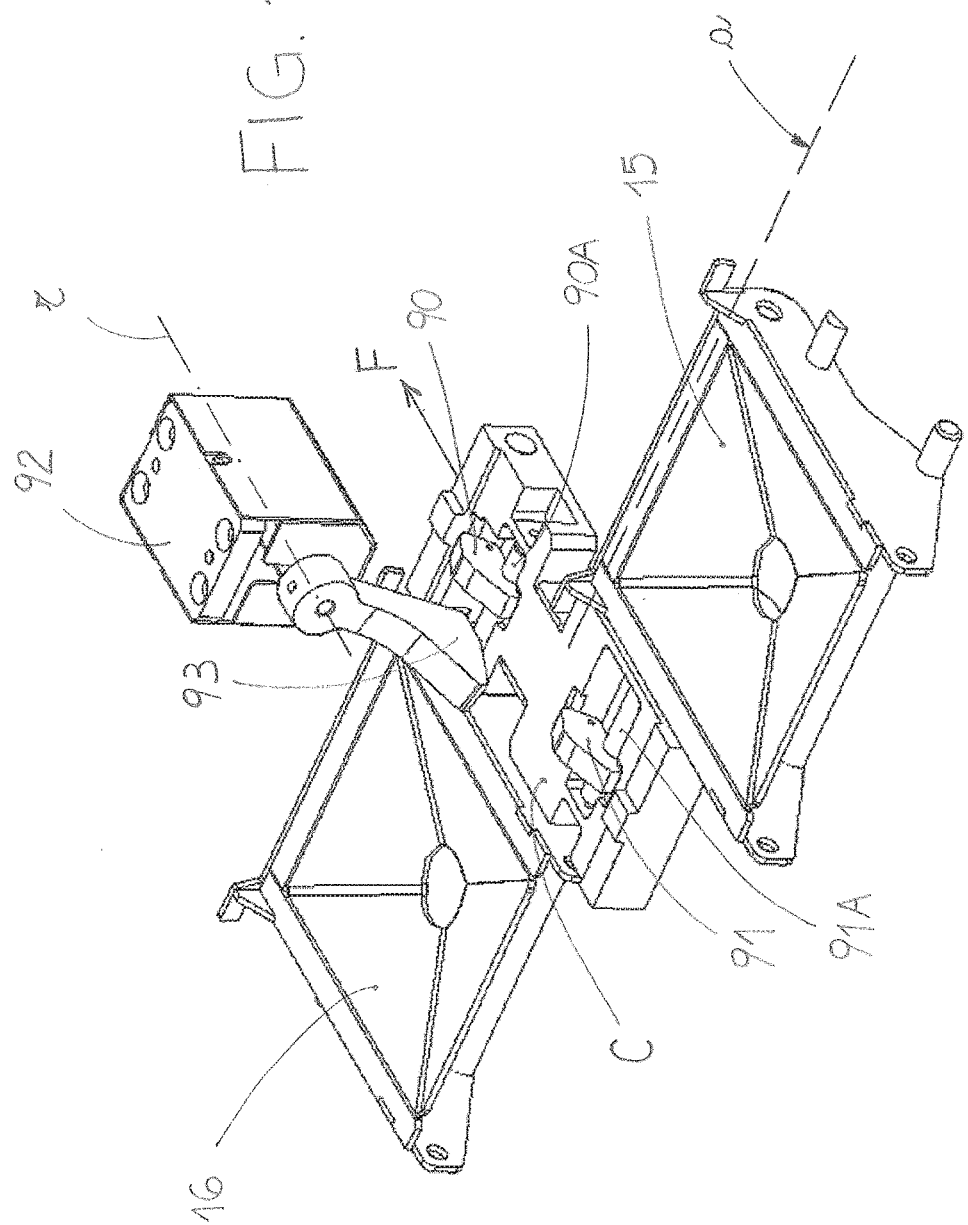

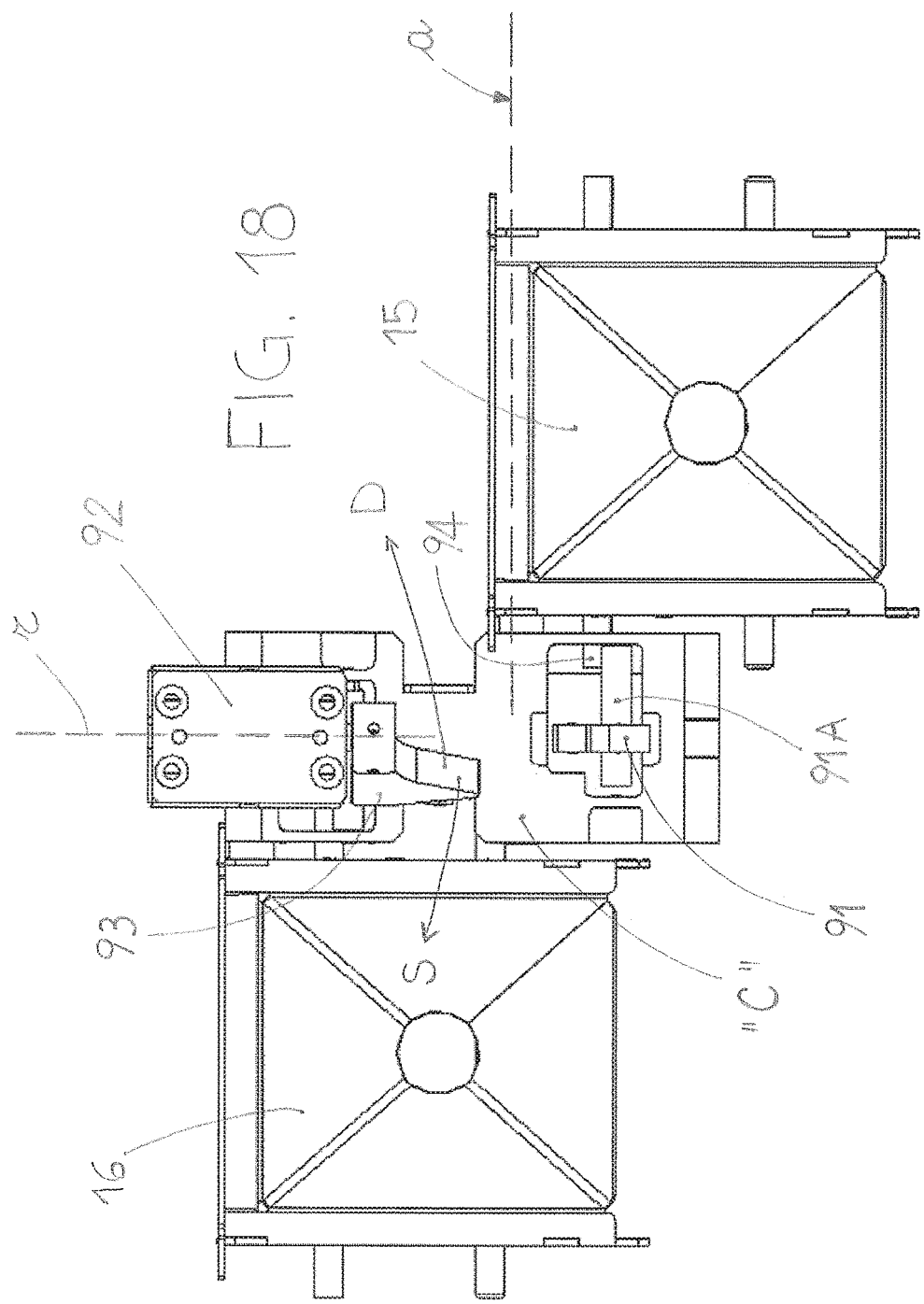

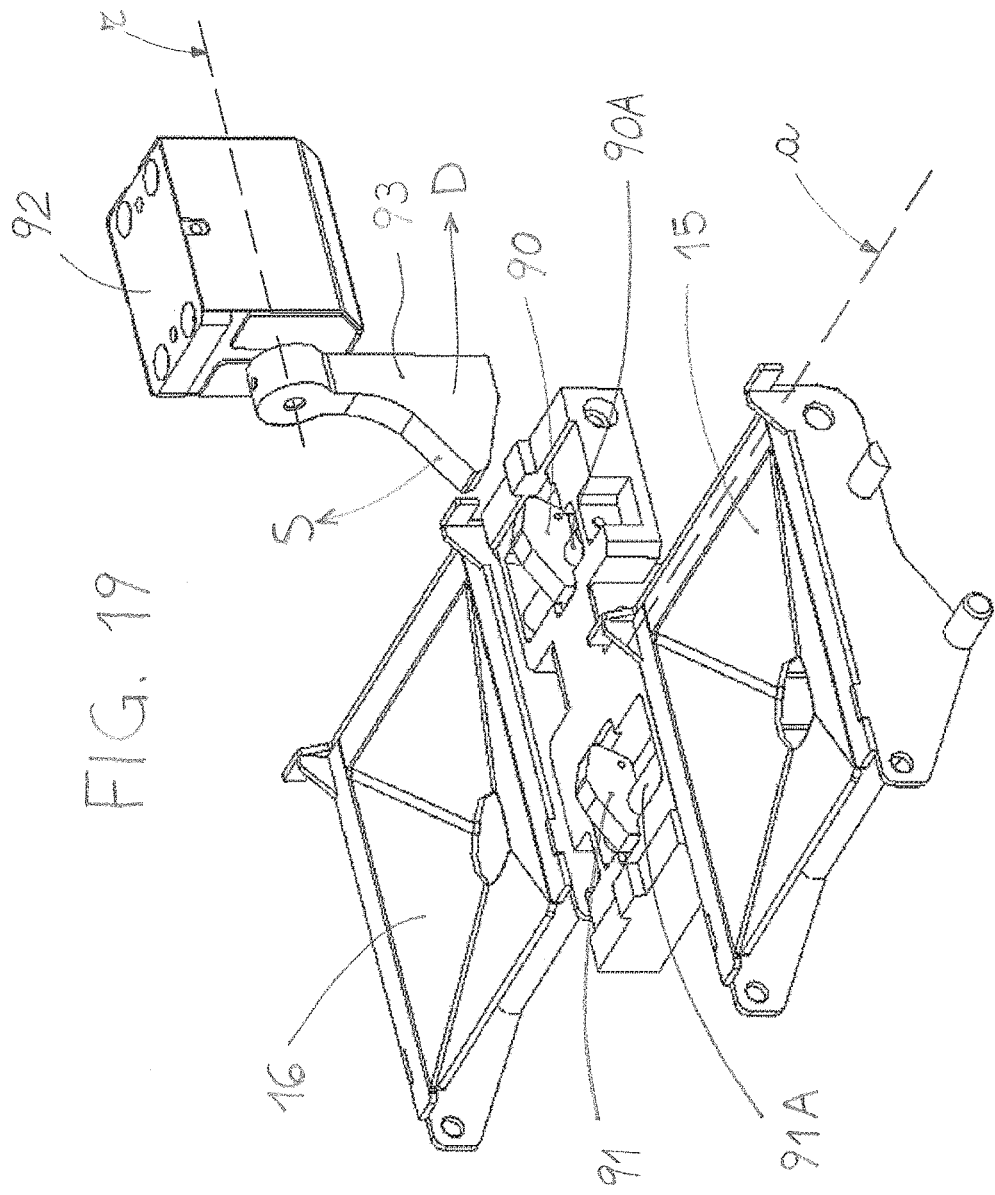

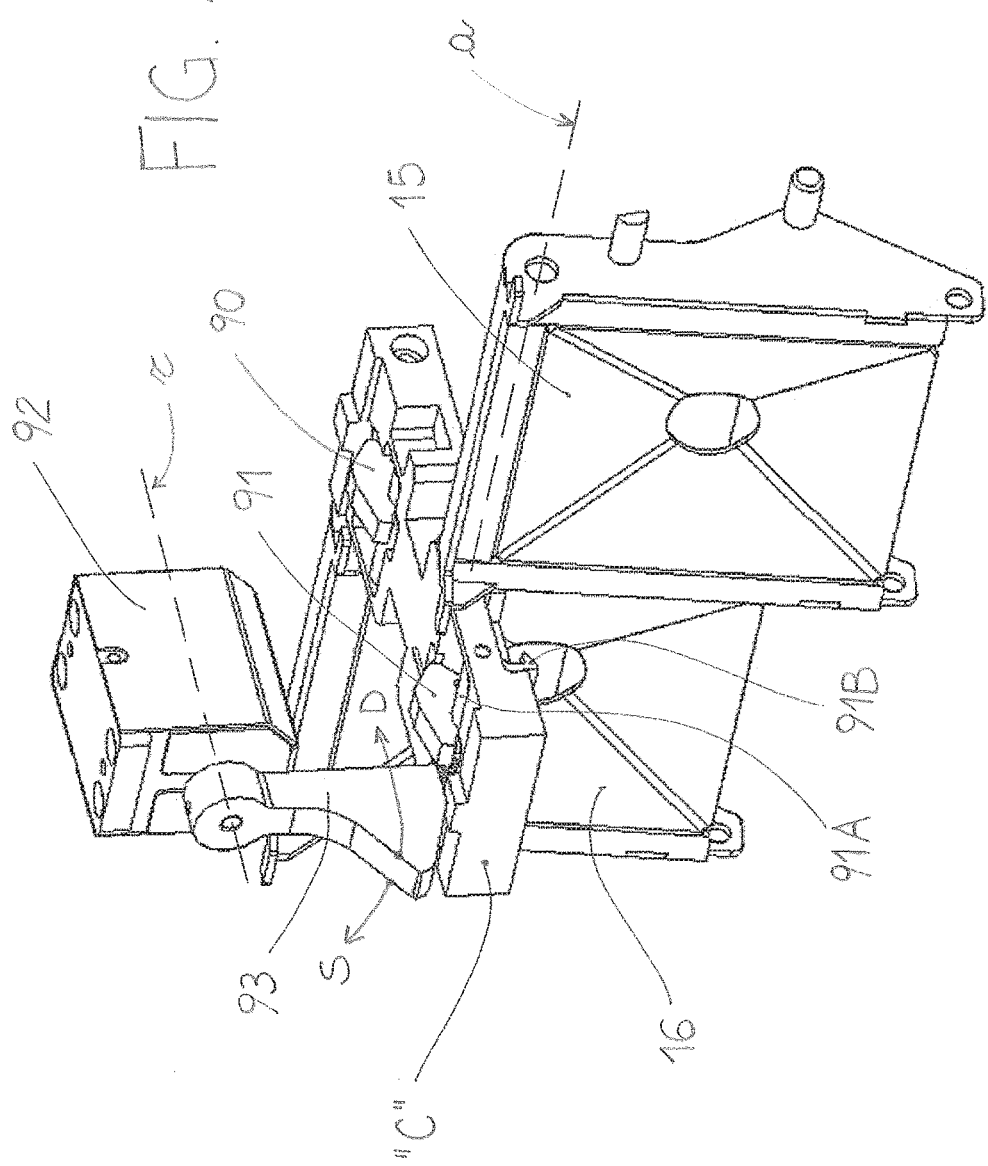

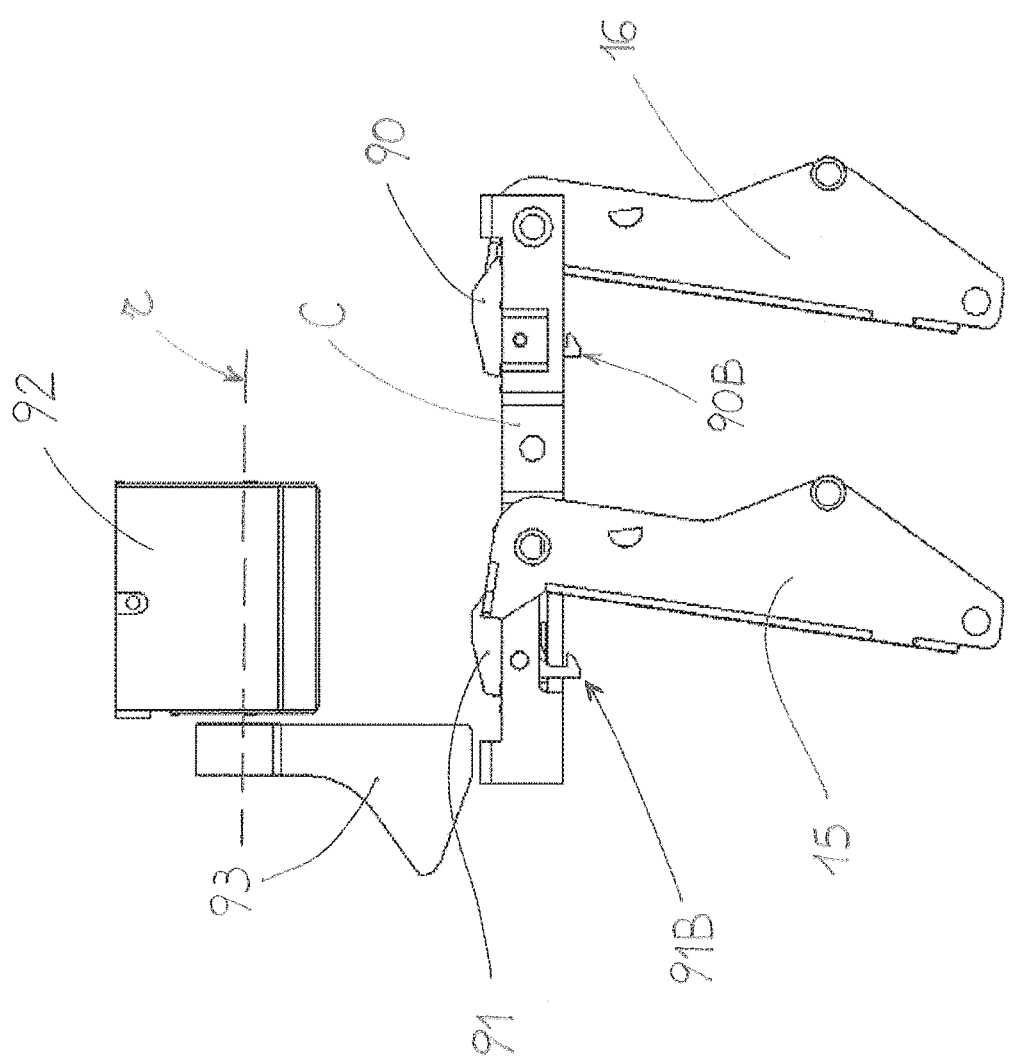

CONVEYOR APPARATUS FOR THE TRANSPORTATION AND WEIGHING OF AGRICULTURAL PRODUCTS

The present invention relates to an improved apparatus for weighing and sorting agricultural products or vegetables presented singularly and transported in succession by a specific apparatus for their transportation, weighing and sorting according to the weight detected for each of said products.

Generally professional/industrial apparatuses realized for this purpose are widely known; for example patent EP 0687508B1 shows an embodiment wherein the apparatus comprises a first roll shackle chain extended horizontally and that moves horizontally along a rectilinear path that in the upper part basically coincides with the elongation line of the same shackle chain; this is achieved by means of a closed path, of the known type, with the return passing under the upper portion.

Said shackle chain comprises a plurality of roll housings and, in a definite position of said shackle chain, a second shackle chain is arranged therein provided with mobile weighting means, with a closed path as well, comprising a plurality of elements or single gripping devices or "grippers", as they will be referred to hereinafter, (for conformity with the terminology generally used in the field) which with a motion synchronized with the underneath shackle chain grip the respective products and weigh them.

From patent EP 1780151B1 it is known a similar apparatus provided with a first and a second shackle chain partly similar to the above said EP 0687508B1 wherein the agricultural products, after being weighed on the second shackle chain, and said grippers reach a definite position wherein it is arranged, in a lower position, a third shackle chain provided with a plurality of single elements or cups; at the time when said cups are brought, with a motion synchronized with the previous weighting shackle chain, under respective said grippers, these are opened and the respective agricultural product is made fall onto the respective cup underneath which carries away the respective product for successive processing and/or sorting.

In practice said three shackle chains can symbolically be represented as in FIG. 9, wherein:
the first shackle chain, of a roll type, is represented by "A",
the second shackle chain, provided with grippers, and used for weighing the products, is represented by "B",
the third shackle chain provided with cup containers is represented by "C".

The described solution has proved to be effective in the treatment and processing of particularly fragile agricultural products and also in avoiding that the weighting systems, with weighing means from below, are frequently dirtied and hence made inefficient, by various kinds of waste normally released by the same agricultural products.

Anyway, in the industrial and commercial sector where the products have to be processed in greater and greater quantities, and wherein a greater and ever increasing productive efficiency is required, said solutions have a progressive inadequacy from their general productivity point of view.

In fact, the processing capability of said solutions, that is their relative capacity, depends on the capacity offered by the slowest of said three shackle chains "A", "B", and "C"; obviously as said three shackle chains have to work rigorously in series one with the other.

It has been shown that, while the shackle chains "A" and "B" can increase their speed within rather high technical limits, the shackle chain "C", on the contrary, is subjected to precise operational constraints.

The first constraint is originated by the fact that it cannot proceed at a speed higher than a suitable value, since if this is exceeded it would result that the agricultural products would be, besides being let fall, also "thrown" forward at a speed component basically similar to that of the same shackle chain "C".

Dealing with rather fragile agricultural products, such effect is completely detrimental and hence unacceptable for the integrity of the same product; and furthermore, even if such effect were accepted, sorting means should be provided such as slipways, channels or other, which would have sufficiently wide dimensions to allow to intercept the products falling therein in a basically diagonal direction.

Anyway, this necessity greatly contrasts against the necessity that said apparatuses should be as much compact as possible and of limited dimensions.

The second constraint consists in the following: with reference to FIG. 1 the following considerations are made.

Let's define with "P" the apparatus capacity, that is the quantity of products that can be processed and transported in the time unit "t", as said above, said capacity has also to be the capacity of each of the three shackle chains "A", "B", and "C".

With reference to FIG. 10, let's represent the shackle chain "C" provided with the cups that in the time "t" carry "N" products.

Let the single cups have an equal distance between centers "d", inclusive of the longitudinal dimension of each cup, and of the necessary dimensional interval between a cup and the adjacent cup.

Further let "S" be the total path made by "N" products in the same time unit "t".

Hence, the "N" products are the result of the division between the total space "S" travelled in the time unit "t" and the length of the single cup, that is of said distance between centers "d":

$$N = S/d$$

Above it has been stated that the capacity "P" is $$P = N/t$$

And hence, combining the two previous relations, $$P = (S/d) \cdot 1/t,$$

that is the capacity "P" is equal to the number of cups S/d which travel the total path S in the time unit "t".
But S/t is the speed "V" of the same shackle chain "C", and therefore the previous relation becomes:

$$P = V/d$$

Hence, in order to increase the capacity "P", from the previous relation results that:
either it must be increased the speed "V" of the same shackle chain "C",
or it must be reduced said distance between centers "d".
But neither of the two conditions can be modified freely beyond a determined limit, as:
the speed "V" of the same shackle chain must be limited below a certain maximum value, because of the above said reasons, and
said distance between centers "d" cannot be reduced beyond the limit determined by the (maximum) dimensions the product to be transported can acquire, as, of course, the dimension of the respective cups must be such so as to safely contain the respective product.

In conclusion, the above mentioned apparatuses have evident and impassable intrinsic limits which do not allow to increase the capacity of the processes carried out and therefore they do not offer any possibility of increasing their productivity based on the current technologies and conditions.

It would therefore be desirable, and it is the main object of the present invention, to realize a type of automatic apparatus for the automatic transportation and weighting of vegetal products apt at overcoming the described constraints and therefore at offering the possibility to significantly increase the apparatus productivity.

Such object is achieved by an apparatus realized and operating according to the appended claims.

Figure 2:
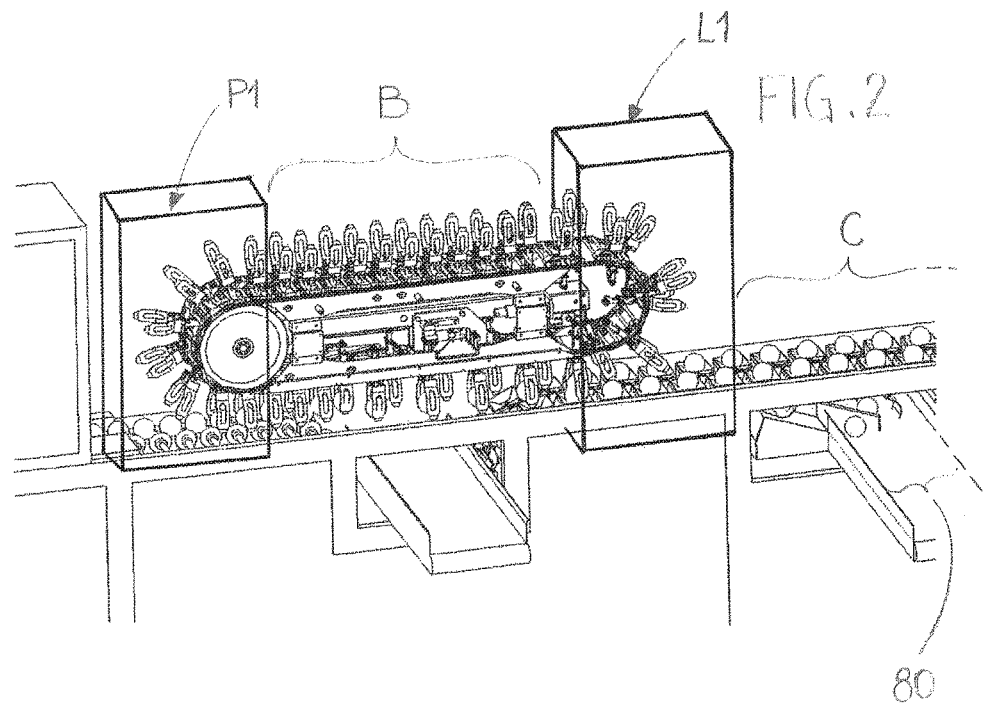
Figure 3:
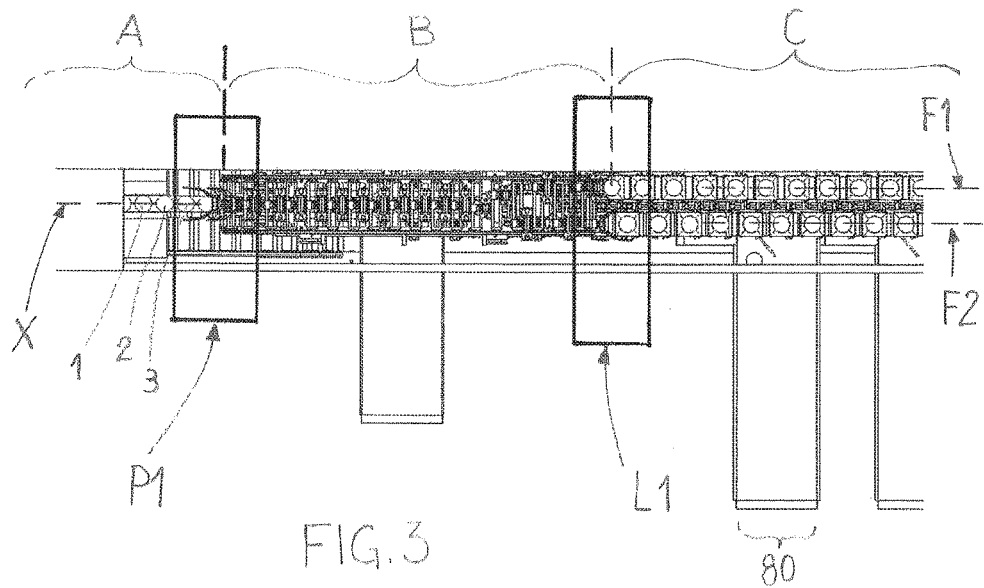
Figure 4:
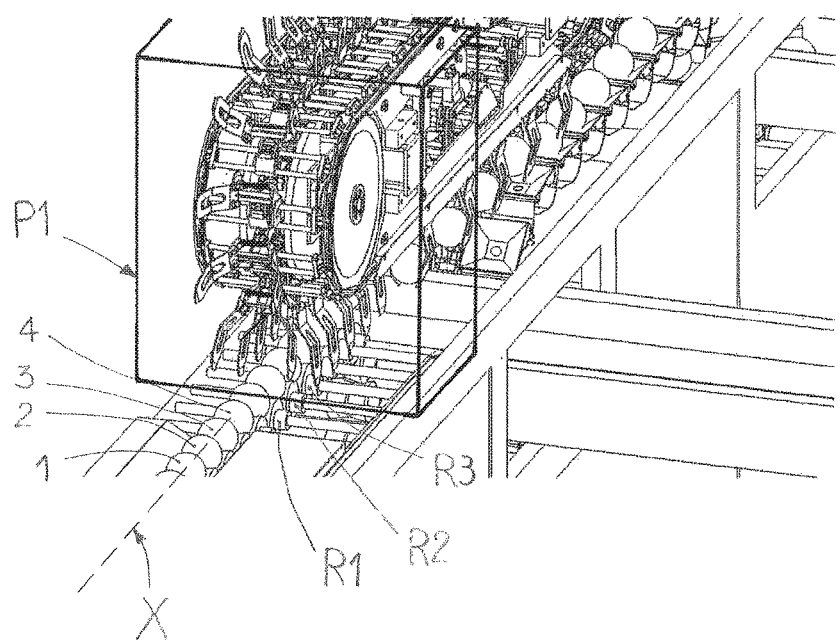
Figure 12:
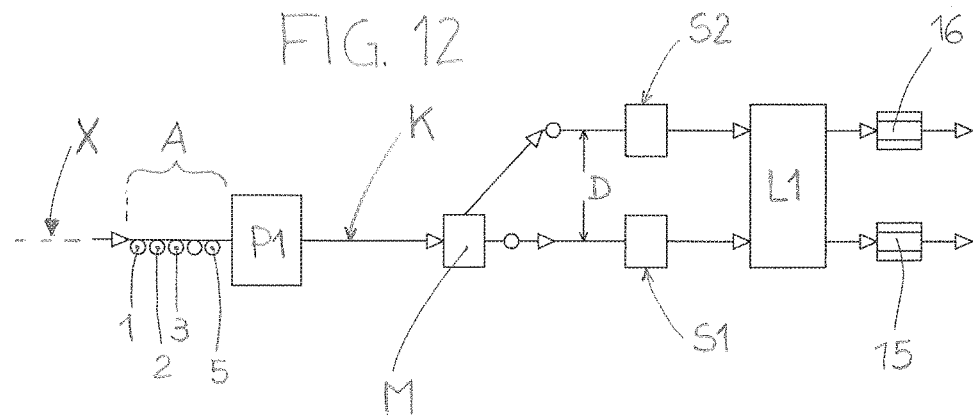
Figure 13:
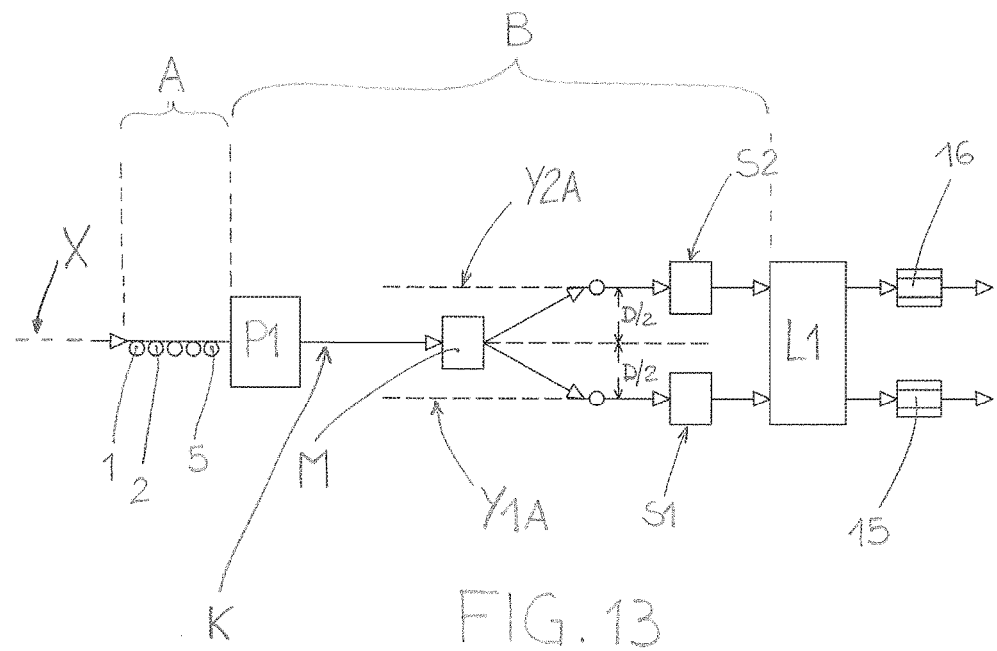
Figure 14:
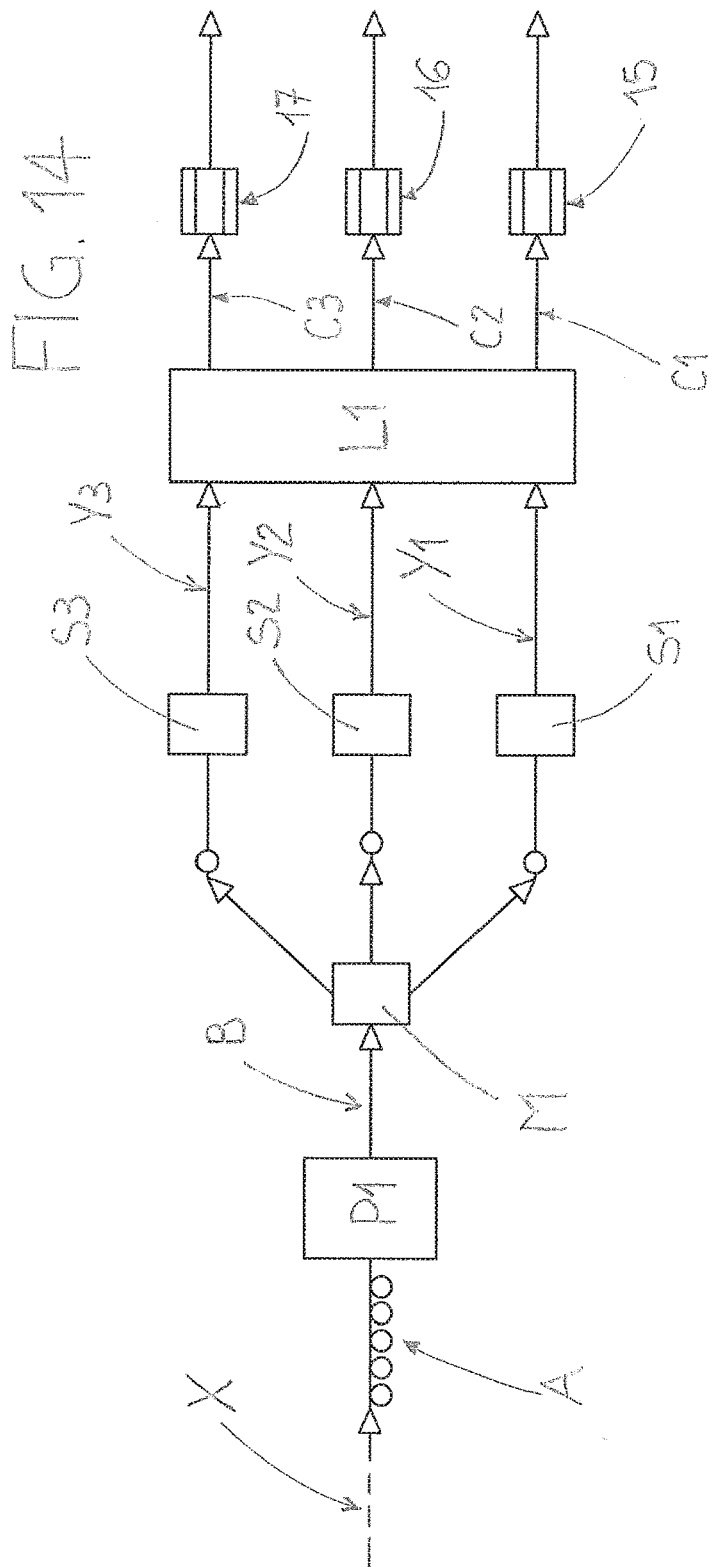
Figure 15:
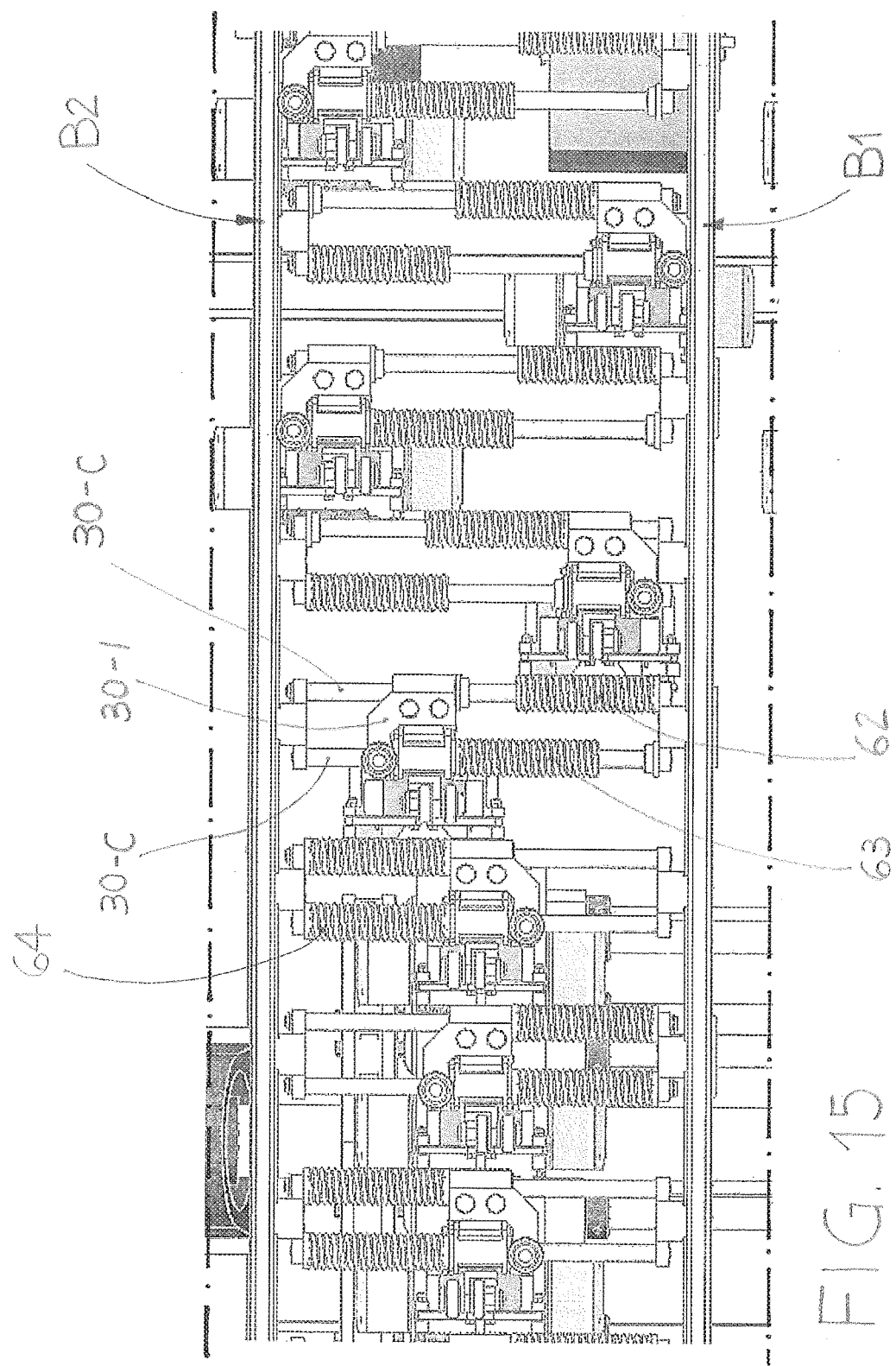
Figure 16:
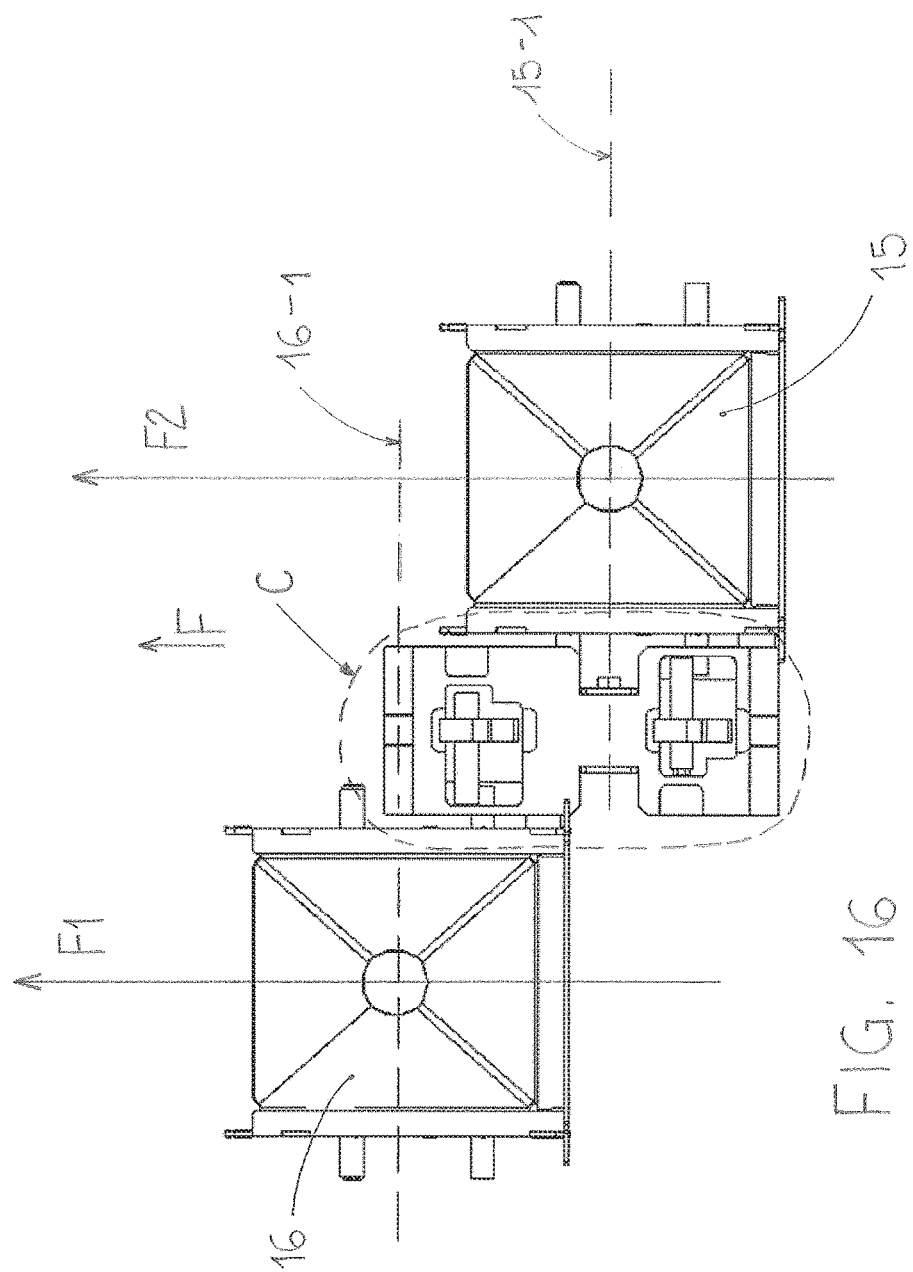

Characteristics and advantages of the invention will become apparent from the following description, for exemplification only but not limited to, with reference to the appended drawings, wherein:

FIG. 1 shows an outer perspective view and from a diagonal position of an apparatus according to the invention, FIG. 2 shows a transparent perspective view of the central portion of the apparatus of FIG. 1, FIG. 3 shows a top plan view of the portion of the apparatus of FIG. 2, FIG. 4 shows a perspective view of an initial portion of the apparatus of the previous figures, FIG. 5 shows a vertical side plan view of the central portion of the apparatus shown in FIGS. 2 and 3, FIG. 6 shows a perspective view of an enlargement of the end portion of the apparatus of the previous figures, without the agricultural products, FIG. 7 shows a perspective similar to FIG. 6, wherein the apparatus is schematically represented in a typical operating state and with some agricultural products being processed, FIG. 8 shows a view similar to FIG. 7, from a different and farther point of view, figures from 9A to 9D show respective top plan or perspective views of a fundamental portion of the apparatus of the invention;

FIG. 10 shows a symbolic representation of some geometric characteristics of the apparatus of the previous figures, FIG. 11 shows a symbolic top plan scheme of a first form of embodiment of a centre portion of the structure and of the operation of the apparatus of the invention, FIG. 12 shows a symbolic top plan scheme of a second form of embodiment of a centre portion of the structure and of the operation of the apparatus of the invention, FIG. 13 shows a symbolic top plan scheme of a third form of embodiment of a centre portion of the structure and of the operation of the apparatus of the invention, FIG. 14 shows a symbolic top plan scheme of a fourth form of embodiment of a centre portion of the structure and of the operation of the apparatus of the invention, FIG. 15 shows a simplified partial top view of the scheme of FIG. 9A and showing some further details, FIG. 15A shows a simplified view of a detail of the described apparatus, seen according to the vertical section plane "n-n" of FIG. 15, FIG. 16 shows a top plan view of an end portion according to an improved form of the apparatus of the invention, FIG. 17 shows a perspective view of the portion of the apparatus of FIG. 16, provided with a further form of improvement of the invention, and shown in a specific operating attitude, FIG. 18 shows a top plan view of the portion of the apparatus shown in FIG. 17, FIG. 19 shows a perspective view of a portion of the apparatus similar to FIG. 17, but shown in a different operating attitude, FIG. 20 shows a perspective view of the portion of the apparatus of FIGS. 18 and 19, but in a different operating attitude, FIG. 21 shows a vertical side plan view of the portion of the apparatus of FIG. 20.

In order to overcome the described inconvenience, that is in order to increase the capacity of the shackle chain "C", which hereinafter will be referred to as "unloading" since the cup containers transferred by it have to unload the respective products in suitable positions along the path of the same shackle chain "C", the easiest and most immediate solution consists in multiplying the number of said shackle chains "C" which typically would have the same dimension and speed characteristics, of the original shackle chain they replicate.

In fact, it is apparent that if it is realized a second shackle chain of the "C" type completely similar to the first one, in the same conditions, the overall capacity is doubled; and if a third shackle chain is made, the overall capacity obviously triples, and so on.

Of course these considerations arise from the assumption that the upstream capacity of the shackle chains "A" and "B" is sufficient to feed all the shackle chains "C" downstream, however such assumption is obvious because the problem it is wanted to solve is, in fact, that of increasing the capacity of only the shackle chain "C", and of course this implies that the capacity of the shackle chains "A" and "B" is sufficient.

As a matter of principle then the problem which arises is that of distributing the products transferred by the single shackle chain "B" or weighting, in a plurality of unloading shackle chains "C" or unloading, ideally identical one to the other, even though this condition is not necessary.

The present invention solves this problem, since it shows an operating method, and an improved apparatus wherein it is arranged:
  only one type "A" or roll transferring shackle chain,
  a plurality of unloading shackle chains "C",
  and, with particular reference to FIG. 9A, transferring and weighting means comprising an initial section wherein this single shackle chain "B", which will be called service shackle chain, acquires a first operating attitude and a successive section wherein this shackle chain acquires a second operating attitude.

Hereinafter there will be described:
  both an example of the operating principle of this single shackle chain "B",
  and a preferred form of embodiment and a respective operating method.

Here a suitable clarification is needed: in a first part of the following present description it will be taken into consideration the specific case that said second shackle chain "B" acquires, downstream of an intermediate station "M" which will be better defined later, such a configuration so that the sole line of grippers 11 is changed and it divides itself into two distinct and parallel lines of grippers which, however, remain applied to the same service shackle chain "B".

In a second part of the following present description it will be taken into consideration the general case which envisages the possibility that said sole line of grippers 11 is changed and divides itself into a plurality, and not only two, of parallel lines of grippers.

In fact even though the solution with only two lines of grippers seems the best from the functional and constructive point of view, however the fundamental teaching of the present invention can advantageously be applied also in the general case that the single line of grippers is changed into three or more different lines of grippers 11.

A) Grippers Distributed Into Two Lines

With reference to figures from 1 to 8, a method according to the invention comprises:
- a first step wherein said agricultural products 1, 2, 3, 4, 5 . . . are separately loaded onto a singling device, or shackle chain "A" which comprises a plurality of pockets preferably formed by adjacent rolls R1, R2, R3 . . . (see FIGS. 4 and 5) linearly arranged according to an axis "X" and on rectilinear motion in translation along a direction substantially parallel to said alignment axis X of said pockets,
- a second step wherein said products are grasped by said singling device in a drawing station P1 (see FIGS. 2, 3, 4, 5, 12, 13, 14, 15) by a first transferring means, and preferably said second shackle chain "B", typically provided with gripping means 11 (grippers) opening downside and known per se, and transferred to a release station "L1" (FIGS. 3 and 5). Moreover, said grippers 11 grasp in succession the products arranged on said singling device "A", (FIGS. 1, 3, 4) and during transportation onto said first transferring means, between said stations "P1" and "L1", said products are singly weighed, according to ways and devices known in the art.
- a third step wherein said products, in said release station "L1", are placed in a second transferring means of the shackle chain type generally identified as "C" typically provided with cup containers, overturnable into suitable positions and selectively controllable in their path according to ways known per se.

During said second step, the handling of said agricultural products grasped by said singling device or shackle chain "A", is continued onto said single shackle chain "B" which acquires two different attitudes; before said shackle chain "B" passes in a specific part of the apparatus structure, which we will define as switching station "M", it carries the grippers 11, and therefore the respective products, along a single horizontal path "K" (see FIG. 12) basically coinciding with said axis X of the pockets; when said grippers reach the switching station "M" the path of said grippers is split, and hence said grippers are distributed, in the ordered way which will later be explained, along two distinct and parallel paths and which proceed at the same speed they proceeded in the section of the shackle chain upstream of said station "M".

Furthermore, said shackle chain "B" is single, and hence its speed is the same both upstream and downstream of said switching station "M"; therefore, what changes in said switching station "M" is solely the position of the grippers 11, and of the respective products on the same shackle chain, but not their speed.

Particularly, it is specified that, in said switching station "M", the grippers 11 are displaced only transversally with respect to the same shackle chain "B", and therefore they are not in any way moved with respect to its longitudinal direction; and hence, in essence, in this station "M" said grippers are re-distributed onto said shackle chain "B" by changing only their transverse position with respect to it, but they keep their longitudinal position, that is in the direction of its motion.

According to the invention, in the transportation phase onto said first transferring means, that is between said stations "P1" and "L1", said grippers 11 and the respective products transported undergo a selective translation motion which consists in distributing said grippers along two or more distinct and parallel alignment axes Y1, Y2.

In practice, all grippers 11 and the respective products are at first used to engage a respective product, and then they are distributed in an ordered way along said two axes Y1, Y2, however keeping themselves on the same shackle chain and consequently being transported by it at the same speed (FIG. 9B).

Synthetically and very clearly, FIG. 12 shows a simplified scheme but aimed at showing the described situation.

At the beginning of the transportation of the products on said roll pockets, and related products, and going from left to right, the following elements shall be observed:
- the shackle chain "A" provided with the respective roll pockets,
- the drawing station "P1" where a second service shackle chain "B", provided with grippers 11, grasps the products from the respective pockets of the shackle chain "A" and makes them move, according to a completely known mode,
- a switching station "M" where the grippers 11, and the respective products, of said second shackle chain "B" are shifted transversally and distributed from the motion along said axis "K" to the motion along said various parallel axes Y1, Y2 . . . . Practically, the single sequence of grippers in said shackle chain "B" is split into two or more sequences of grippers which move along parallel paths and at the same speed; said switching station "M" has therefore the only function of realizing said splitting of a single incoming sequence, or line, changing it into two lines of grippers moving at the same speed but along parallel paths Y1 and Y2. Basically and in short, the shackle chain "B" remains single, it is the various grippers 11 that are alternatively displaced onto an outer side and onto the other outer opposed side of the same shackle chain, with a motion orthogonal to the direction of the motion of the shackle chain "B", which direction is parallel to said alignment "Y1" and "Y2",
- the release station "L1" wherein each of said sequences/lines along the respective said parallel paths Y1 and Y2, releases the respective products carried onto respective parallel shackle chains C1, C2 . . . each of which carries a continuous sequence of respective cup containers 15, 16 . . . .

Each of said shackle chains C1, C2 . . . together with the respective cup containers is completely similar, and ideally identical, to a parallel cup shackle chain, and therefore it will not be described any further.

Furthermore, it will be understood that an advantageous embodiment consists in the fact of not realizing distinct shackle chains C1, C2, C3 . . . any more but a single shackle chain "C", whereon said respective cup containers 15, 16 are placed, of course on different alignments and hence on different "lines" F1, F2 symbolically represented in FIGS. 6, 7, 11 and therefore on different transverse positions with respect to the advancement direction of the sole shackle chain.

Definitively it is achieved the desired result that initially the grippers 11 are distributed on two or more distinct and parallel alignments Y1 and Y2, and that the same plural alignments are also kept in the positioning and in the motion of the cup containers arranged on said shackle chain "C" or more shackle chains C1, C2, C3 as explained above.

To be extremely clear it is here confirmed that the choice of only one shackle chain "C" or of more shackle chains C1, C2, C3 . . . is typically a choice for a planning and constructive optimization, and it does not minimally affect the final configuration of both the position and the motion of the various cups, which anyway move:
- on parallel alignments and respectively coincident with said alignments "Y1", "Y2" . . . of the grippers 11,
- at the same speed,
- and wherein each cup container keeps its position with respect to the other containers of the same line,
- and hence each cup container is initially placed in a respective line, and it permanently remains in that line.

In essence, and in short, it will soon be understood that such configuration of the shackle chain "C" allows to transfer the double or the triple etc. depending on the fact that the lines of the cup containers are two, or three etc in the same time unit and of course being all the other conditions equal, and particularly:
- the speed of the motion of the shackle chain "C", or C1, C2, C3 according to the constructive configuration,
- the longitudinal dimension of each of said cup containers,
- and of course the distance between a cup container and the successive or previous container aligned with it.

At this point, the skilled in the art will already have understood the real nature and the operating mode of the invention; synthetically, the intermediate or weighting shackle chain, referred to in FIG. 5 with the same symbol "B" and which transfers the grippers 11 and respective products between the drawing "P1" and the release "L1" stations is divided into two distinct sections; upstream of said switching station "M" said grippers are aligned along a single axis "K", while downstream of the switching station "M" the same grippers are distributed along two axes Y1, Y2.

In essence, after having grasped the respective products, said same gripping means or grippers 11 are distributed in a sequential and ordered way along respective alignment axes Y1, Y2 so that one and only one axis Y1 or Y2 is associated to the same gripping means or gripper 11.

At this point, and as explained above, when each of said grippers, anyway distributed on said axes Y1, Y2 reaches the common release station "L1", it releases the respective products transported onto respective unloading shackle chains C1, C2 . . . each of which carries a continuous sequence of respective cup containers 15, 16 . . . . In this regard, see in particular FIGS. 2, 3, 5 and 6.

It is apparent, therefore, that in this way the overall capacity of the unloading shackle chains C1, C2 . . . has been multiplied on the obvious conditions that the other parameters of speed, distance between cups and distance between cup centres remain the same.

As for the mechanical and technical devices, and the operating modes in order to realize the type of operation envisaged, and that is the subdivision of the shackle chain B into a plurality of other shackle chains, each one carrying a respective part of grippers 11, such subject in general and the relative technologies are well known per se and applied in a lot of different sectors, and therefore they are not part of the present invention.

After the grippers 11 have released the respective product to the respective cup, said grippers are again transferred in the opposite direction, with respect to the direction with which they have been distributed along said two axes "Y1" and "Y2", though still being carried in the sole initial shackle chain "B"; therefore said grippers are again aligned in an ordered way so as to present themselves, with the same sequence as the sequence with which they had previously been switched by the initial shackle chain "B", to the successive said axes Y1, Y2.

This method, too, can be realized with means and modes known per se, and ideally equal but inverted with respect to those used just previously to switch and subdivide the initial shackle chain "B", and the corresponding grippers 11, into said axes Y1, Y2.

The devised solution allows some advantageous improvements mainly of the operational and constructive kind, so as to facilitate both the construction and the standardization of the components used and in order to make their respective operation more uniform and cyclical.

A first improvement consists in the following: with reference to figures from 1 to 9, and to FIG. 13, the grippers of the service shackle chain "B" are de-aligned with respect to the initial axis "K" and are re-aligned according to axes Y1A and Y2B (see FIG. 13) which are still parallel one to the other but they are substantially symmetrical with respect to said axis "K"; in practice each gripper is displaced for a path "D/2" long in the opposed direction while in the previous solution (FIG. 12), and in order to keep the same distance "D" between parallel lines, the grippers of the line of grippers "Y2", which has to be displaced, are translated for the same distance D.

It is therefore clear that, being the transverse translation speed equal for each line of grippers, the solution of FIG. 13 is much more advantageous since the path D/2 long is only half the length of the path "D" and therefore it is required a halved time to travel it; with a resulting increase of the productivity of the apparatus, or a corresponding shortening in the longitudinal direction of the shackle chain "B".

A second improvement relates to the weighting of products; this is carried out after the respective gripping means or grippers 11, by which they are supported, have been subjected to said translation along said two distinct and parallel alignment axes (Y1, Y2); see, in fact, in FIG. 13 the presence of two distinct weighting stations "S1" and "S2", known per se, symbolically represented and arranged downstream of the common said switching station "M", each arranged so as to measure the weight of the products moving along the respective axis "Y1" or "Y2".

The purpose of this improvement consists in the fact that, generally, after each gripper has engaged a respective fruit, and has started to displace it, it may happen that this engagement is not stable and the fruit falls soon after having been gripped; in this case, if the gripper were weighed soon after said engagement, it would happen that only the empty gripper would be weighed, with clear inconveniences in the processing and sorting downstream, in particular in the definition of the respective indexing software; in fact, if a fruit falls before the switching station "M", and both the weighting stations are downstream of said switching station "M", then it will be immediate not only to recognize the product missing on a corresponding gripper, but also immediately to identify that said gripper is or not on an alignment "Y1", or on an alignment "Y2".

This greatly simplifies the respective software, as it is completely avoided the information processing representative of the alignment of each gripper, that becomes a constant element and hence known by construction.

Furthermore, the resulting increase of the interval between one gripper and the other after the side switching, that is this interval is at least doubled, allows to use weighting stations wherein the weighting step is carried out in a much longer time, and therefore with much greater precision and reliability than in the case of only one line of grippers, as in the known art.

A third improvement relates to the mechanical solutions to realize said transverse displacement of the grippers along the two parallel axes Y1 and Y2; with reference to figures from 2 to 9D, 15 and 15A, the shackle chain "B" is now shown with the respective outer side rims, here represented by two chains, B1 and B2, of course parallel and coplanar.

In definite positions at regular intervals of said two chains, or outer rims, B1 and B2 there is arranged a plurality of couples of supports facing inward and reciprocally overlooking and facing one another, so that the two supports which face exactly and respectively one another 30-A, 30-B, 31-A, 31-B, 32-A, 32-B . . . make a respective couple of supports.

On these supports there are arranged linking means, preferably a couple of rods 30-C, 31-C, 32-C . . . ; which, because of their construction, are extended orthogonally to said axes "Y1", "Y2".

Said grippers 11 comprise a respective upper sledge 30-D, 31-D, 32-D . . . which is engaged on respective said rod couples 30-C, 31-C, 32-C . . . ; thanks to the construction of said rods and of said supports, said sledges 30-D, 31-D, 32-D . . . are able of sliding freely on the respective rod couple 30-C, 31-C, 32-C . . . so that the respective said grippers can be displaced in the two outer positions 11-A and 11-B, as clearly shown in figures from 9A to 9D . . . wherein the grippers which are on the same axis Y1 are identified as 11-A, and the grippers which are aligned on the same axis Y2 are identified as 11-B.

In order to obtain said displacement in the said two outer positions 11-A and 11-B, are made and employed shifting means, that can be made through the known art, such that when each of said sledges 30-D, 31-D, 32-D . . . reaches said station "M", it is displaced, by means of, for example, cam elements, towards either of said two chains or outer side rims B1 and B2; furthermore and advantageously, in order to have an effective distancing "N" between each gripper and the respective support 30-A . . . with respect to the support 31-A (FIG. 9B) which immediately precedes or follows it and which belongs to the same alignment axis "Y1", said supports, and of course the corresponding grippers and the respective products, are displaced from said switching station "M" alternatively towards either of said two chains B1 and B2.

In this way the products and the corresponding grippers which are aligned on the same axis "Y1" or "Y2" are the grippers that previously were on the shackle chain "B", and hence before reaching said station "M", they are arranged alternating with one another, even though still obviously aligned along said axis "K".

A further improvement relates to the means and modes of transverse displacement of said sledges, and practically the realization of said station "M": with reference to figures from 9A to 9D, 15 and 15A, said sledges get to the position in said switching station "M" substantially aligned along said axis "K".

In order to shift said sledges along said two chains "B1" and "B2", they are made to travel an aisle 50 arranged centrally between said two chains B1 and B2, and formed by two sides 51 and 52, fixed to the apparatus structure, faced to each other and separate, wherein the separation space forms said aisle 50; this is arranged parallel to said two chains "B12" and "B2".

Further, there are arranged elastic means, in particular cylindrical springs 62, 63, 64 . . . as schematically shown in FIGS. 15 and 15A, which are coaxial with the respective said rods, mounted so to urge each sledge towards either of said two chains "B1" and "B2", and such that this urging is alternate, so that a first sledge is urged towards the chain "B1", the following sledge towards the chain "B2", the successive one again towards the chain "B1", and so on.

Said sides 51 and 52 towards their end portion in the direction of the motion of the sledges have a flaring, that is a regular widening angle "G" (see FIG. 9B) whose sides 53, 54 are oriented towards the respective said chains "B1", "B2".

In practice, it will be soon understood that said two sides 51, 52, said aisle 50 and said inclined sides 53, 54 act as a cam; the sledges that are caused to travel said aisle 50, and that are urged by the respective springs towards either of said chains B1 or B2, cannot move transversally, being kept in the aisle 50 by said sides 52, 53, as far as the end of said aisle 50, but as soon as they reach said two inclined sides 53, and 54, said sledges are urged by the respective springs to slide along said sides until each sledge is arrested at the end of the respective couple of rods against said chain B1 or against the opposed chain B2.

Hence, the same sledges are re-aligned at and along said chains B1 or B2 and thus it is achieved the shifting of the various grippers 11 on the two alignment axes Y1 or Y2.

In this way it is achieved the desired result that the various grippers together with the respective fruits, are re-aligned on two distinct and parallel lines, and therefore it can be realized a system of cup containers downstream, comprising two distinct lines of cups, wherein the cups 15, 16 of each line are aligned and substantially move on respective parallel lines F1 and F2 and aligned on the same vertical planes wherein the respective said axes Y1 and Y2 are arranged.

Furthermore, this construction allows to realize a particularly advantageous embodiment from the constructive and operating point of view; in fact, since said cylindrical springs always act in the same direction, the various components described above can be combined so that each gripper is shifted towards only one and the same alignment axis, and this is repeated each time the same gripper is periodically brought back to its initial position in said drawing station "P1", after having been brought back to that position by the same shackle chain which travels the return path in a continuous and cyclical way.

A further improvement consists in the following: with respect to the portion of the apparatus comprising the end portion, that is the unloading shackle chains C1, C2, with the plurality of the respective cup containers 15, 16, 17 . . . according to an advantageous improvement and a productive and operational standardization said unloading lines C1, C2 are as many as said axes "Y1", and "Y2" and aligned to them when said gripping means reach the release station (L1), each gripping means belonging to the respective axis Y1 or Y2 release in a selectively controllable way a respective product on a respective cup container belonging exclusively to a specific and respective unloading shackle chain, so that all the gripping means or grippers 11 belonging to a same axis release the respective products onto respective cup containers belonging to a same respective unloading shackle chain C1, C2.

Practically each axis Y1 or Y2 is associated to only one and corresponding unloading shackle chain C1, C2; and hence the respective products transferred by the grippers 11 belonging to and aligned on the different same axes "Y1" and "Y2" are released only onto the cup containers belonging to the respective unloading shackle chain arranged along a respective line F1 or F2, aligned with the corresponding alignment axis "Y1" or "Y2".

A further fundamental improvement is realized as follows: in order to allow that each product, after having been weighed and released onto a respective cup container, is placed by the respective cup onto a specific conveying means whereon only the product whose weights are within pre-defined intervals can be placed therein, there are provided command and control means which are able of:
- weighing (in Stations S1, S2) and comparing the weight of each product with respect to a plurality of pre-defined weight intervals,
- indexing each of the gripping means or grippers 11 according to the weight interval measured in the respective transported product,
- maintaining said indexing along the path of the corresponding gripper along:
  - the respective service shackle chain,
  - the successive and corresponding unloading shackle chain,
  - and the cup container whereon each corresponding gripper, already indexed, releases the respective product,
- overturning each of said cup containers identified in FIG. 11 with numbers 30, 40 on the shackle chain "C1", and identified with numbers 60, 70 on the parallel shackle chain "C2", in a pre-determined longitudinal position or unloading mouth 80 corresponding to a pre-determined indexing value, so that in said pre-determined position 80 only those products whose weight is comprised in a respective and pre-determined interval of a pre-determined weight are unloaded.

A further improvement relates to the unloading modality of the various products from the respective cup containers; with reference to FIG. 7, each of said cup containers 15, 15A, 15B . . . 16 . . . is provided, on the respective exit or unloading edge 15-U . . . , 15A-U . . . that is that edge which is passed over by the falling product when the respective cup is overturned, with a driving slide 15-S, 15A-S . . . removable and preferably rotating on a hinge, placed onto the respective exit/unloading edge 15-U . . . , 15A-U . . . ; the advantage of this solution is based on the fact that the overturning of the respective cup container causes the lowering of the respective said unloading edge 15-U . . . , 15A-U . . . , and of the respective product too; the latter is therefore pushed to exit that edge and to move, without bumps or violent falls, from the respective cup container to a respective collecting mouth.

Another improvement can be easily made as follows: since one of the objects of said apparatus is also that of keeping its dimensions as compact as possible, besides that of increasing its productivity by increasing its capacity, the present improvement consists in arranging the cup containers 15, 15A, 15B . . . which are aligned and successive in a same unloading shackle chain, for ex. in the shackle chain C1, in a substantially contiguous way (see FIG. 7) so that the respective facing edges 15-1, 15A-U etc are spaced to each other by a minimum distance Dmin. This also allows to diminish to the maximum said distance between centres "d" between said containers, which automatically makes the number N of containers passing in the time unit increase, and therefore it further increases the maximum capacity of the same unloading shackle chain.

Another improvement consists in the following: with reference to FIG. 11 it is shown a schematic top view of the two unloading shackle chains C1 and C2.

The improvement consists in the fact that said two shackle chains are arranged shifted to each other in the longitudinal sense, that is in their motion direction, so that the transverse axis T1 which is median between two centre transverse and parallel axes 30X and 40X of the respective cup containers 30 and 40, contiguous and belonging to the same shackle chain "C1", never coincides with a same transverse axis T2 median between other two containers 60 and 70 contiguous and belonging to the different shackle chain "C2".

Anyway, FIG. 11 is completely explicative on the subject.

In practice the cup containers arranged on different shackle chains C1, C2 . . . are arranged with shifted positions with respect to each other, meaning that the respective transverse axes T1 and T2, of course in a motion synchronous with the motion of the shackle chain "C" never coincide one with the other, and this is true for any couple of similar transverse axes relative to any couple of containers belonging to different shackle chains.

Of course, the foregoing is also true when the unloading shackle chain "C" is only one and the cup containers are arranged aligned on two different and parallel lines "F1" and "F2" associated to said sole shackle chain "C".

A further improvement is advantageously achieved with the following embodiment: with reference to Figures from 16 to 21, the improvement consists in the fact that the apparatus, besides being equipped with only one shackle chain "C" (as previously explained), is also realized so that such shackle chain "C" is arranged between said two lines "F1" and "F2", as shown in FIG. 16, wherein the direction of the shackle chain "C" is shown in said figures from 16 to 19 by the arrow "F"; furthermore, said shackle chain "C" supports the plurality of the cup containers which, as already previously explained, are shifted in the motion direction, as shown in FIG. 16 wherein the transverse axis 15-1 relative to the container 15 is noticeably distinct from the similar transverse axis 16-1 relative to the cup container 16.

For simplicity, hereinafter it will be meant that said shackle chain "C" is to be referred to the centre portion thereof and which is between the two lines "F1" and "F2"; anyway this explanation will be completely apparent seeing the figures from 16 to 21, where the identification "C" is, in fact, used to show that centre portion.

As shown in figures from 16 to 21, said shackle chain "C" is provided with a plurality of "cam" actuating means 90, 91 . . . .

Each of said "cam" actuating means is able of being lowered or released, through a suitable actuating means or "command arm" 93 which will be better described later, that is fixed with the apparatus structure and overhanging said centre portion "C".

With reference to figures from 17 to 21, an actuating means 92 integral with the apparatus structure is arranged in a position overhanging the shackle chain "C" and is provided with a command arm 93 oriented downward and able of being rotated around a horizontal axis "r" (see figures from 17 to 21) overhanging the shackle chain "C" and parallel to it; therefore said command arm 93 is able of rotating in the two opposed directions, shown with "S" and "D" in FIGS. 18, 19 and 20.

Said "cam" actuating means 90, 91 . . . are oriented upwards and are substantially placed underneath said command arm 93, and able of being intercepted by it from above, so that the selective rotation of said arm 93 in the two said directions "S" or "D" makes it possible that the lower portion of said arm 93 is able or not, depending on their position, (whether rotated in the "S"/"D" direction or allowed to elongate vertically downward), of intercepting from above said "cam" actuating means 90, 91 . . . and practically is able of selectively lower them or leave them in the initial position with respect to said shackle chain "C".

Each of said "cam" actuating means 90, 91 . . . is, in turn, provided with a respective spindle or rod also acting as an axis of rotation 90A, 91A . . . basically orthogonal to the motion direction of said shackle chain "C" (see figures from 17 to 20) and able of transmitting the motion of the respective cam 90, 91 . . . to a respective clasping means 90B, 91B (see FIGS. 20, 21) which, in turn, is able of engaging/disengaging with a suitable and respective clasping means, not shown, arranged laterally and in the upper part of the respective cup containers and facing towards said shackle chain "C".

The mutual configuration, dimension and arrangement of the just described devices is such that, when the actuating means 92 is not actuated, the respective arm 93 intercepts downwards singularly said cams in succession 90, 91 . . . and push them downwards, applying a slight rotation to them.

Because of said displacement of said cams and of the consequent displacement of the respective rods 90A, 91A . . . said respective clasping means 90B, 91B . . . are activated so as to disengage a respective cup container, so that, this one, not supported any more, is overturned downwards rotating around a respective axis "a", which is transverse to said shackle chain "C" and passing on a side of the edge of it, and orthogonal to said shackle chain "C", as shown in figures from 17 to 20.

Of course and conversely, if said actuating means 92 is on the contrary activated, then the respective arm 93 is rotated in one of the directions "S" or "D", so that it occurs the opposed functionality with respect to the one previously described, and that is the cam 90 that at that moment is passing under the actuating means 92 is neither pushed nor therefore rotated, which practically leaves everything unchanged and the respective cup container is not overturned, according to the respective indexing instructions.

It will therefore be apparent to the skilled in the art that based on the indexing information of each of the cup containers, when this container passes in correspondence of said actuating means 92 it is actuated or not depending on the respective indexing information, so that each of said cup containers is overturned only in the pre-determined chosen position so that it will fall exactly in the fruit unloading mouth wherein it is to go and it is to be sent.

Synthetically it is realized the following sequence of relations:
  fruit weight measurement,
  classification of the category of that weight,
  allocation or indexing of the respective gripping means 11 with that category,
  tracking the position of said gripping means and allocation of the same category also to the cup container whereon said gripping means causes the fruit to fall so that said cup container too is indexed in the same way,
  continuous control of the motion of said cup container on said shackle chain "C", up to the position wherein it passes above said specific fruit unloading mouth chosen to receive all and only the fruits whose weight falls into the same specific category within which the fruit had been classified,
  actuation of said actuating means 92 so that the fruit falls into the unloading mouth of the final destination.

Of course it is soon to be pointed out the fact that, in the presence of a plurality of different weight categories and of correspondingly distinct unloading mouths arranged in different positions along the shackle chain "C", it is also realized and installed a corresponding plurality of similar and distinct actuating means 92 arranged in different positions on said shackle chain "C", and here it is to be understood that we are referring to the stable and fixed place with the apparatus structure where the shackle chain "C" moves, since said actuating means 92 as well have necessarily to be stable with respect to the corresponding unloading mouths, and therefore they have to be fixed with respect to the whole structure of the apparatus.

The just described improving variation allows two important advantages: first of all the presence of said actuating means 92 in a position higher than the shackle chain "C" avoids a rather serious inconvenience, and that is the progressive fall of foreign bodies, dust, leaves, etc. on an actuating means placed under the shackle chain, as in the known art, makes it useless in a very short time.

Furthermore, the fact of having chosen said actuating means 92 in a position higher than the shackle chain "C" involves the even further advantage that also the respective cams 90, 91, the respective rods 90A, 91A . . . and said respective clasping means 90B, 91B . . . are placed both in a higher position with respect to the containers and in the centre position on the same shackle chain "C"; this achieves the further benefit that neither said devices can be dirtied and hence blocked, and furthermore the substantially symmetrical position and structure of this end part of the apparatus, with said shackle chain "C" arranged between the two lines F1 and F2, results to be efficient both from the point of view of the constructive burdens and from the point of view of its use.

B) Grippers Arranged on More than Two Lines

With reference to FIG. 14 the following considerations are to be made since the just described solution wherein the two parallel shackle chains C1 and C2, each one provided with the respective cup containers, solves the given problem or anyway it improves the productivity of the apparatus.

In fact, in the solution with the two shackle chains C1 and C2 the speed of each of these shackle chains results to be half the speed of the single shackle chain with the cup containers, being the other conditions the same such as the capacity, the size of the cup containers, etc.

And hence it is soon apparent that if the shackle chains with the cup containers become more than two, for example three, or four etc., then, at an overall constant capacity, the speed of said multiple parallel shackle chains C1, C2, C3 . . . consequently is reduced to ⅓ respectively to ¼ etc. with respect to the speed with only one shackle chain with cup containers.

And conversely, as an expected consequence, if the speed of each of the shackle chains C1, C2, C3 . . . is kept constant then the speed of the shackle chain B can be increased in the same ratio with respect to the speed of the same shackle chain "B" in the case of only one shackle chain with cup containers downstream.

However, as the productivity of the whole apparatus is directly dependent also on this speed of the shackle chain "B", of course, being all the other conditions the same, then it ensues the desired result that the multiplication of the lines or of the axes Y1, Y2, Y3 . . . whereon the grippers of the shackle chain "B" are distributed and the corresponding multiplication of the downstream shackle chains C1, C2, C3 . . . each of them provided with the respective cup containers 15, 16, 17 . . . makes it possible to multiply in a direct way the capacity, always provided that the other conditions are the same, and hence the overall productivity of the apparatus.

FIG. 14 exemplifies this object: it shows the case wherein the grippers, travelling the shackle chain "B", when they reach the switching station "M" are distributed onto three different and parallel alignment axes Y1, Y2, Y3 each provided with a respective weighting station S1, S2, S3.

With modes completely similar to what just described, are realized the three shackle chains C1, C2, C3 corresponding to said alignment axes Y1, Y2, Y3 so that practically it can be realized an apparatus conceptually similar to the apparatus with only two shackle chains C1, C2 but constructively different and above all more performing.

This general solution has been described with the purpose of clarifying and exemplifying unequivocally the essential content of the invention and its teaching; therefore it is assumed that the just given explanation together with FIG. 14 is sufficient for the skilled in the art to realize an apparatus according to the invention in a plurality of different embodiments and with a variable and multiple number of alignment axes Y1, Y2, Y3 . . . and respective multiple parallel shackle chains C1, C2, C3 . . . .

The realization of such prospective apparatuses can acquire different forms and constructive attitudes, all of them known per se and anyway feasible by the skilled in the art; however those prospective different apparatuses would only be technical equivalents from both the constructive and operational point of view of the above described constructive solutions, and therefore they are not described any further.

The invention claimed is:

1. A method for the handling and weighing of each of a succession of agricultural products comprising:
    separately loading said products onto a singling device, said singling device comprising a first conveyance which comprises a plurality of pockets formed by adjacent rolls, said pockets being linearly arranged and moving in translation along a direction substantially parallel to the alignment line of said pockets,
    grasping said products from said singling device in a drawing station and transferring said products by a second conveyance to a release station using grippers that open in a downward direction and successively grip the products placed on the singling device,
    in the release station, placing the products onto a third conveyance,
    wherein the handling of said agricultural products from loading onto said singling device, onto said second conveyance and onto said third conveyance is continuous,
    weighing said products individually during transfer from said drawing station to said release station,
    initially moving said grippers and the respective products held by the grippers along the same initial axis, and, in the path portion between said drawing station and said release station, laterally shifting at least some of said grippers to align said grippers sequentially along two or more distinct and parallel axes, wherein at least one of said axes is distinct from said initial axis with each gripper being associated one and only one of said alignment axes;
    wherein the step of placing the products onto a third conveyance comprises placing the products onto a plurality of unloading shackle chains, said plurality of unloading shackle chains corresponding in number to the number of distinct and parallel axes along which the grippers travel, each chain comprising a plurality of cup containers in a line which is aligned with one of said parallel axes;
    wherein the grippers aligned in each parallel axis, at the release station, releases a product into a cup container forming part of the unloading shackle chain aligned with said corresponding axis.

2. The method according to claim 1, wherein said third conveyance comprises only one shackle chain, and said grippers are shifted with respect to said initial axis, and are re-aligned on two axes parallel to each other but substantially symmetrical with respect to said initial axis.

3. The method according to claim 2, comprising weighing said products after the respective grippers, from which they are supported, are shifted onto said two or more distinct and parallel alignment axes.

4. The method according to claim 1, wherein said grippers move at the same speed along the respective parallel axes, and wherein one of said alignment axes corresponds said initial axis.

5. The method according to claim 4, comprising weighing said products after the respective grippers, from which they are supported, are shifted onto said two or more distinct and parallel alignment axes.

6. The method according to claim 1, wherein the weighing of said products is carried out after the respective grippers are shifted onto said two or more distinct and parallel alignment axes.

7. The method according to claim 1, wherein:
    said third conveyance comprises a plurality of unloading shackle chains corresponding in number to, and aligned with said alignment axes, wherein each unloading shackle chain comprises a plurality of cup containers arranged into a line which is aligned to a respective one of said alignment axes,
    wherein when said grippers reach said release station, each gripper belonging to a specific alignment axis releases a respective product into a cup container belonging to an unloading shackle chain aligned therewith, whereby all grippers aligned along a same axis release the respective products onto respective said cup containers belonging to a same respective unloading shackle chain.

8. The method according to claim 7, further comprising:
    comparing the weight of each product with respect to a plurality of pre-defined weight intervals,
    indexing each gripper according to that weight interval that includes the weight of the respective transported product held by the gripper,
    maintaining said indexing associated with the respective product along the path of the corresponding gripper of the respective cup holding such product in a shackle chain and,
    overturning each of said cup container in a pre-determined longitudinal position corresponding to a predetermined weight-interval that includes the weight of the respective product, so that in said pre-determined longitudinal position are unloaded only those products whose weight is included in a respective and pre-determined weight interval.

9. The method according to claim 1, wherein said third conveyance comprises only one weighing shackle chain, said method comprising shifting said grippers with respect to said initial axis into two axes parallel to each other but substantially symmetrical with respect to said initial axis.

10. The method according to claim 1, comprising moving said grippers at the same speed along the respective alignment axes, wherein one said alignment axis overlaps said initial axis.

11. The method according to claim 1, comprising weighing said products after the respective grippers, from which they are supported, are shifted onto said two or more distinct and parallel alignment axes.

12. An apparatus comprising
a singling device comprising a first conveyance having plurality of pockets formed by adjacent rolls, linearly arranged and in rectilinear motion in translation along a direction substantially parallel to the alignment line of said pockets,
a second conveyance comprising a plurality of grippers, configured to successively grip products carried by said singling device at a drawing station and transferring the products to a release station, said grippers opening in a downward direction,
a third conveyance, said grippers configured to release the products onto said third conveyance at a release station,
wherein the handling of said agricultural products from said singling device, onto said second conveyance and onto said third conveyance is continuous,
said apparatus comprising a weighing device configured to weigh each product carried by said second conveyance in the path of said second conveyance between said drawing station and said release station,
said second conveyance comprising first and second outer sides and a plurality of rods extending between said sides orthogonally to the direction of travel of said second conveyance,
each of said grippers comprising an upper support mounted on at least one of said rods,
a shifter associated with each respective gripper, said shifters being configured to shift the grippers alternately towards the first and second sides,
said third conveyance comprising a series of cup containers arranged in first and second parallel lines and moved longitudinally by the same unloading shackle chain, wherein the cup containers in one of said lines are shifted with respect to the cup containers in the other of said lines in the longitudinal sense in the direction of longitudinal motion,
wherein said grippers shifted toward said first and second sides of said second conveyance are aligned with the cup containers of said first and second lines of said third conveyance, respectively, whereby products are transferred from said second conveyance to the first and second lines of said third conveyance.

13. The apparatus according to claim 12, wherein to said second conveyance comprises:
a switching station arranged between said drawing station and said release station, said switching station comprising two fixed side guides facing each other and forming between them an aisle, the downstream end, in the direction of movement of said second conveyance, of said two side guides having flared portions that open towards said first and second outer sides, respectively,
each said shifter comprising an elastic element mounted a respective rod to urge the respective gripper towards one of said first and second outer sides when said supports pass along the inclined portions of said side guides,
wherein each of said elastic elements is configured to urge a respective gripper to only one of said first and second outer sides.

14. The apparatus according to claim 13, wherein said cup containers are arranged, on the same unloading shackle chain, in a substantially contiguous way, so that the facing edges of respective contiguous cup containers are spaced to each other by a minimum distance.

15. An apparatus comprising
a singling device comprising a first conveyance having plurality of pockets formed by adjacent rolls, linearly arranged and in rectilinear motion in translation along a direction substantially parallel to the alignment line of said pockets,
a second conveyance comprising a plurality of grippers, configured to successively grip products carried by said singling device at a drawing station and transferring the products to a release station, said grippers opening in a downward direction,
a third conveyance, said grippers configured to release the products onto said third conveyance at a release station,
wherein the handling of said agricultural products from said singling device, onto said second conveyance and onto said third conveyance is continuous,
said apparatus comprising a weighing device configured to weigh each product carried by said second conveyance in the path of said second conveyance between said drawing station and said release station,
said second conveyance comprising first and second outer sides and a plurality of rods extending between said sides orthogonally to the direction of travel of said second conveyance,
each of said grippers comprising an upper support mounted on at least one of said rods,
a shifter associated with each respective gripper, said shifters being configured to shift the grippers alternately towards the first and second sides,
wherein said third conveyance comprises:
two parallel lines of cup containers, the cup containers in the respective lines being shifted with respect to each other in the direction of motion of said third conveyance, each cup container comprising a clasp,
a center portion located between said two parallel lines of cup containers, said center portion comprising a plurality of movable cam elements, wherein each said cam element is configured to be moved to at least two positions for respectively engaging or not engaging respective clasps arranged on said cup containers, whereby said cams are positionable to selectively engage clasps of cup containers of said third conveyance to selectively overturn cup containers to remove products carried by said cup containers.

16. The apparatus according to claim 15, wherein said cup containers are each rotatable about a hinge for unloading a product held in said containers.

17. The apparatus according to claim 15, further comprising at least one actuator positioned above said center portion of said third conveyance, each of said actuators comprising a command arm oriented downwardly and rotatable about an axis which is parallel to the direction of travel of the third conveyance whereby a lower portion of said command arm selectively engagable with said clasps of said cup containers.

* * * * *